(12) United States Patent
Wilson et al.

(10) Patent No.: US 7,069,185 B1
(45) Date of Patent: Jun. 27, 2006

(54) COMPUTERIZED MACHINE CONTROLLER DIAGNOSTIC SYSTEM

(75) Inventors: Dennis C. Wilson, Roseville, MN (US); Brian Deviley, Roseville, MN (US)

(73) Assignee: Wilson Diagnostic Systems, LLC, Little Canada, MN (US)

( * ) Notice: Subject to any disclaimer, the term of this patent is extended or adjusted under 35 U.S.C. 154(b) by 0 days.

(21) Appl. No.: 09/650,626

(22) Filed: Aug. 30, 2000

Related U.S. Application Data

(60) Provisional application No. 60/189,945, filed on Mar. 16, 2000, provisional application No. 60/180,936, filed on Feb. 8, 2000, provisional application No. 60/151,499, filed on Aug. 30, 1999.

(51) Int. Cl.
   *G06F 17/00* (2006.01)

(52) U.S. Cl. ........................ 702/188; 702/33; 702/176; 702/182; 702/183; 700/9; 700/26

(58) Field of Classification Search ........ 702/182–188, 702/33, 35, 36, 57–59, 81, 113, 115, 124, 702/176; 700/26, 17, 177, 9, 23, 174, 108
See application file for complete search history.

(56) References Cited

U.S. PATENT DOCUMENTS

| | | | | |
|---|---|---|---|---|
| 3,882,305 | A * | 5/1975 | Johnstone | 702/183 |
| 4,396,974 | A * | 8/1983 | Imazeki et al. | 700/9 |
| 4,471,348 | A * | 9/1984 | London et al. | 345/2.2 |
| 4,734,869 | A * | 3/1988 | Mickowski | 702/183 |
| 4,747,048 | A | 5/1988 | Mueller | 700/79 |
| 4,851,985 | A | 7/1989 | Burror et al. | 700/79 |
| 4,908,746 | A | 3/1990 | Vaughn | 700/18 |
| 4,964,065 | A * | 10/1990 | Hicks et al. | 709/226 |
| 4,996,655 | A | 2/1991 | Chadwick et al. | 702/127 |
| 5,008,842 | A * | 4/1991 | Nagai et al. | 702/183 |
| 5,142,469 | A | 8/1992 | Weisenborn | 700/17 |
| 5,214,577 | A | 5/1993 | Sztipanovits et al. | 700/79 |

(Continued)

FOREIGN PATENT DOCUMENTS

DE    34 13 330 A    12/1984

(Continued)

OTHER PUBLICATIONS

"RSRules Machine Diagnostics", Technical Data. Rockwell Software Inc. 1998.*

(Continued)

*Primary Examiner*—Marc S. Hoff
*Assistant Examiner*—Jeffrey R. West
(74) *Attorney, Agent, or Firm*—Patterson, Thuente, Skaar & Christensen, P.A.

(57) ABSTRACT

A computerized machine control (CMC) diagnostic system communicates with a computerized machine controller that utilizes a control program to control the operation of a machine through the use of a plurality of digital channels. In general terms, the system includes a data acquisition component, a data storage component and a viewing component. The data acquisition component queries and acquires time-based transition data about the plurality of digital channels. The data storage component stores the acquired transition data in order to establish an historical pattern of the transition data that can be compared to currently acquired transition data. The historical pattern of transition data is established independently of the control program. Upon comparison of the current transition data to the expected, historical pattern of transition data, a determination about the operational status of the machine being controlled can be made. The operational status can then be displayed on the viewing component.

9 Claims, 14 Drawing Sheets

U.S. PATENT DOCUMENTS

| | | | |
|---|---|---|---|
| 5,293,323 A | 3/1994 | Doskocil et al. | 702/185 |
| 5,319,353 A * | 6/1994 | Ohnishi et al. | 340/525 |
| 5,325,522 A | 6/1994 | Vaughn | 707/1 |
| 5,377,315 A | 12/1994 | Leggett | 345/440 |
| 5,453,933 A * | 9/1995 | Wright et al. | 700/181 |
| 5,469,352 A * | 11/1995 | Yukutomo et al. | 700/87 |
| 5,486,998 A | 1/1996 | Corso | 700/32 |
| 5,586,156 A * | 12/1996 | Gaubatz | 376/216 |
| 5,592,396 A * | 1/1997 | Tambini et al. | 702/45 |
| 5,684,718 A | 11/1997 | Jenkins et al. | 702/57 |
| 5,754,451 A * | 5/1998 | Williams | 702/185 |
| 5,771,374 A | 6/1998 | Burshtein et al. | 713/502 |
| 5,812,759 A | 9/1998 | Brooks | 714/57 |
| 5,850,066 A | 12/1998 | Dew et al. | 219/109 |
| 5,870,693 A * | 2/1999 | Seng et al. | 702/59 |
| 5,923,903 A * | 7/1999 | Alvarez-Escurra et al. | 710/62 |
| 5,926,621 A | 7/1999 | Schwarz et al. | 714/26 |
| 5,949,676 A * | 9/1999 | Elsley | 700/79 |
| 5,953,226 A | 9/1999 | Mellish et al. | 700/18 |
| 5,970,430 A * | 10/1999 | Burns et al. | 702/122 |
| 6,006,171 A * | 12/1999 | Vines et al. | 702/184 |
| 6,014,612 A * | 1/2000 | Larson et al. | 702/183 |
| 6,017,143 A | 1/2000 | Eryurek et al. | 700/51 |
| 6,026,352 A | 2/2000 | Burns et al. | 702/182 |
| 6,226,762 B1 * | 5/2001 | Foote et al. | 714/48 |
| 6,229,433 B1 * | 5/2001 | Rye et al. | 340/310.12 |
| 6,233,611 B1 * | 5/2001 | Ludtke et al. | 709/223 |
| 6,539,339 B1 * | 3/2003 | Berry et al. | 702/186 |
| 6,665,648 B1 * | 12/2003 | Brodersen et al. | 705/7 |

FOREIGN PATENT DOCUMENTS

| | | |
|---|---|---|
| JP | 11095802 | 9/1999 |
| WO | WO 99/32950 | 7/1999 |

OTHER PUBLICATIONS

Rockwell Software, "Getting Results with RSRules." (Jan. 1999).*

*RS Rules™ Machine Diagnostics*, Technical Data, Rockwell Software Inc., 4 pgs.; 1998.

* cited by examiner

Fig. 15

| I/O VIEW – AT CURSOR | ☒ |
|---|---|
| OUTPUT NAME | LIVE |
| SHUTTL S1 ENABLE SHUTTLE DRIVE | OFF |
| SHUTTL S1 HYD PUMP H1 MTR | OFF |
| SHUTTL S1 HYD PUMP H3 STA SRH | OFF |
| SHUTTL S1 PALLET PRESENT IN CORN | OFF |
| SHUTTL S1 SHUTTLE CYCLED PL | OFF |
| SHUTTL S1 SHUTTLE ADV D PL. | OFF |
| SHUTTL S1 CLOSE ESCAPEMEN SOL | OFF |
| SHUTTL S1 ADVANCE PUSHER CORNER | OFF |
| SHUTTL S1 DISENGAGE SHUTTLE SOL | OFF |
| SHUTTL S1 SHUTTLE DIS-ENGAGED P | OFF |

| INPUT NAME | LIVE |
|---|---|
| SHUTTL S1 SPARE | OFF |
| SHUTTL S1 HYD PUMP H3 RUN G (STA | OFF |
| SHUTTL S1 HYD PUMP H1 RUN G MTR | OFF |
| SHUTTL S1 HYD #3 LOW LEVEL FLS | OFF |
| SHUTTL S1 CLAMP TABLE MTR OVERLO | OFF |
| SHUTTL S1 ADVANCED (AUX O) CR | OFF |
| SHUTTL S1 DISENGAGE #1 LS | OFF |
| SHUTTL S1 ESCAPEMEN CLOSED LS | OFF |
| SHUTTL S1 SHUTTLE DISENGAGE #2 L | OFF |
| SHUTTL S1 PUSHER ADVANCED LS | OFF |
| SHUTTL S1 ADV D CORNER B SHOT PI | OFF |
| SHUTTL S1 SPARE | OFF |
| SHUTTL S1 SPARE | OFF |
| SHUTTL S1 OFFLINE ON/OFF SS | OFF |

COMPUTERIZED MACHINE CONTROLLER DIAGNOSTIC SYSTEM

CLAIM TO PRIORITY

The present application claims priority to United State Provisional Patent Application No. 60/151,499, filed Aug. 30, 1999 and entitled "PLC Diagnostic Device and Method", to U.S. Provisional Patent Application No. 60/180,936, filed Feb. 8, 2000 and entitled "PLC Diagnostic Device and Method", and to U.S. Provisional Patent Application No. 60/189,945, filed Mar. 16, 2000 and entitled "Programmable Logic Controller Diagnostic System and Method." The contents of each of the three above-identified provisional patent applications is hereby incorporated by reference.

FIELD OF THE INVENTION

The present invention relates to machine and process control systems and, more particularly, to a diagnostic tool for the monitoring of those machine and process control systems.

BACKGROUND OF THE INVENTION

Manufacturers in the United States are making extensive use of computerized machine control systems including programmable logic controllers (PLCs), personal computers, computer numerical control (CNC), and other systems utilizing digital input/output signals to control machinery and processes. These systems have permitted the application of complex logic to achieve automation and control objectives. The very power of the control systems themselves has lead to a problem of considerable magnitude for American industry.

Although productive in their own right, these complex control systems have given rise to a significant problem in that the diagnosis of malfunction on machinery so controlled may be very difficult. This has created a manufacturing environment where expectations of uptime on expensive assets have dropped to very low values. It is not uncommon for manufacturers to get, and be satisfied with, asset utilization of only 50%. This low realization of asset utilization is prevalent even among the more capable manufacturers such as in the automotive industry.

The underlying problem with the extensive downtime of many machines controlled by control systems is that the logic in the control system is so extensive and so complex. Even experienced and capable electricians and technicians have great difficulty in finding the root cause of an operating malfunction. It is not uncommon for even a simple machine to have thousands of lines of code in its control system.

In a large and complex factory, such as an automotive transmission plant, there may be several hundred thousand lines of code in each of hundreds of individual control systems. Electricians and technicians can not possibly become familiar with all of this program logic. When they are confronted with an operating problem on a given machine they may spend hours trying to understand enough of the control system logic so that they might find the source of the problem. It has become common knowledge in industry that the largest single component of downtime on machinery is the diagnostic time. It is not unusual to experience hours of diagnostic time only to find that the actual repair takes just a few minutes.

Programs to educate electricians have not been fruitful because the body of information that they need to understand is so large and, even worse, is constantly changing. Engineering changes and new equipment keep the body of control system logic in any given plant in a state of flux. Even further, the electricians and technicians are frequently moved from one department to another exacerbating the problem of education. It is estimated that the United States problem on downtime due to the diagnostic period on programmable controlled machinery is in the order of more than one hundred billion dollars annually.

I. How PLCs Operate

Programmable logic controllers are devices that get input signals from the real world and use these inputs in the solution of Boolean logic. The results of the solution are then applied to one or more outputs that affect the behavior of some machinery or process. The inputs are most often in the form of discrete digital signals, but sometimes they may be analog in nature. The outputs are usually electric motors, electric valves, signals to other devices, or alarm devices.

The programmable logic controller is a special purpose computer that rapidly does this job of getting inputs and then turning outputs off or on according to some predetermined pattern of logic. The controllers often are capable of going through a cycle of getting inputs, solving logic, and updating outputs more than twenty times per second.

The most common use of the programmable logic controller is to take a given machine through some repetitive sequence of operations. An example is a simple drill press where the controller operates outputs to make the following sequence of operations:

1. Load the part
2. Clamp the part
3. Start the drill spindle
4. Feed the drill to the required length
5. Retract the drill
6. Stop the drill spindle
7. Unclamp the part
8. Remove the part The above example is very simple and almost trivial, but it illustrates the sequential nature of most control applications.

A programmable controller operating the above drill press would need a series of inputs to tell it when to go to the next phase of the machine cycle. Once the part was loaded in step one for instance, the controller might get a signal from a proximity switch telling the controller that indeed there now is a new part in place ready to be clamped. Once the controller had the signal from the proximity switch it would proceed to turn on the output that operated the clamping device. Once the clamp had extended to the desired position to have the part securely clamped, a signal might be sent from another proximity switch to tell the controller to start the spindle.

A position transducer might send a continuous signal to the controller to tell it that the drill spindle is extending the drill. When the controller saw the correct value of the analog signal telling it that the drill had extended to the proper length it would turn on an output to start the retraction of the drill.

If the above drill press was operating in a full automatic cycle, making one part after another with no human intervention, the successful completion of operation number eight (part removal) would send a signal to the controller to initiate another cycle. This signal is usually called the cycle start signal.

II. How Problems Occur

When one of the input devices in the above example fails, the machine will stop sequencing. It is then said that the machine has dropped out of automatic cycle. In a very large percentage of the automatic cycle interruptions an input has failed to come on at the desired time, or an output has failed to operate and has not sent its signal to the controller. The problem the diagnostician is faced with is that many machines have hundreds of inputs and outputs operated on by several thousand lines of program code.

For example, in the above simple drill press example, if the part sensing switch did not sense a part at the end of operation one, no signal would be sent to the controller and operation two would not begin. This could be caused by a faulty proximity switch or by a mechanical malfunction whereby no part was actually loaded.

Let us suppose that the part is actually present, but the proximity switch that senses the part in place has failed. The machine operator observes that the machine is no longer cycling and tries to get the machine into automatic cycle by manually removing the part and pressing the manual cycle start button. The machine will again fail to make a cycle so the operator informs the supervisor that the machine is not working. The supervisor then puts in an order to have an electrician look at the machine and repair it.

Sometime later an electrician arrives at the machine. Often the operator has already been assigned to another machine that is operating and is no longer around. The electrician finds the machine in an idle mode and maybe there is a part in the machine fixture, or maybe not. Some machines may have an error message screen that may help define the problem but most do not. Even the machines that have better error messaging may have several messages on screen by the time the electrician arrives.

The electrician may see a part in the clamping fixture but it is not possible to determine where the automatic cycle actually stopped. It could have been that the part had been clamped and the drill spindle did not start. It could have been that the spindle started by it could not advance. The usual case is that there are many possibilities, and in the typical mode of operation the person responsible for the diagnostics has no way of determining which is the most probable source of the problem and which is the least probable cause.

Programmable logic controllers do not keep any history of their operations so the electrician has little information to tell why the machine stopped. Even further, in most factories the electrician may not even be sure of the nature of the sequence of operation of the machine. The electrician probably does not know the address of the inputs and outputs so it is not possible to do a simple inspection of the machine to tell why it has stopped operating.

Even if the machine has an error messaging system, it often has hundreds of possible messages many of which do not give a clear description of the nature of the error. The diagnostic process is often trial and error. This explains the long diagnostic time actually experienced in almost all factories using programmable logic controllers.

Frequently the diagnostician begins the search for the problem by examining the current state of the logic in the controller. This approach has two significant shortcomings. First, the logic is usually very complicated, much more complicated than the simple example above, and second, the state of the inputs and outputs in the controller at the time of diagnostic examination is not the same as the state that existed at the exact time when the machine stopped. The latter point is exemplified by looking at the input and output table of the drill press example described above.

Most controllers keep the current status of the inputs and outputs in a table in the controller's memory, usually in a bit fashion. If an input is on, the bit assigned to that input is a one and if an input is off, the bit is zero. A similar table is kept for the outputs. Physically, the input cards for the controllers usually come in multiples of eight. An input table for the simple drill press above might look as follows:

| Input Number | 0 | 1 | 2 | 3 | 4 | 5 | 6 | 7 |
|---|---|---|---|---|---|---|---|---|
| Status | 0 | 0 | 0 | 0 | 0 | 0 | 0 | 0 |

Where the inputs are defined as follows:
  0. Cycle start
  1. Part sensed in fixture
  2. Clamp fully extended
  3. Spindle Operating
  4. Clamp fully retracted
  5. Drill fully retracted
  6. Coolant flow sensor
  7. Unused In addition to the above discrete inputs, there would be one analog input from the drill position transducer.

The output table for the simple example would look like:

| Output Number | 0 | 1 | 2 | 3 | 4 | 5 | 6 | 7 |
|---|---|---|---|---|---|---|---|---|
| Status | 0 | 0 | 0 | 0 | 0 | 0 | 0 | 0 |

Where the outputs are defined as follows:
  0. Signal to robot to place part
  1. Part clamp forward
  2. Part clamp retract
  3. Spindle motor
  4. Drill feed motor forward
  5. Drill feed motor retract
  6. Coolant valve open
  7. Signal to robot to remove part When the machine is operating normally the status of the input table at the exact time the part was successfully placed would look like:

| Input Number | 0 | 1 | 2 | 3 | 4 | 5 | 6 | 7 |
|---|---|---|---|---|---|---|---|---|
| Status | 0 | 1 | 0 | 0 | 0 | 1 | 0 | 0 |

In this part of the sequence, when input one came on, the controller would turn on output one to move the part clamp forward. When the part sensor proximity switch failed the input table would look like:

| Input Number | 0 | 1 | 2 | 3 | 4 | 5 | 6 | 7 |
|---|---|---|---|---|---|---|---|---|
| Status | 0 | 0 | 0 | 0 | 0 | 1 | 0 | 0 |

Note that there is a unitary probability that input one would be on at this part of the cycle. If the electrician knew exactly where the machine had dropped out of automatic cycle, and if the electrician knew that at the same time input one was a zero and not a one, the cause of the problem would be clearly defined.

There have been various attempts to provide a diagnostic tool to help diagnosticians determine where an error or failure within a system has occurred. Most of these require that additional error detecting logic be added to existing controller code or that a user enter and establish relationships/rules between inputs and outputs. For example, U.S. Pat. No. 5,953,226 (hereby incorporated by reference) describes a diagnostic system that is implemented within the main program, i.e., ladder logic control program, itself. Specifically, the diagnostic system is a special control module that is added to the application program in the form of additional ladder logic within the main program or as a subroutine. Either method requires that the logic within the main program that is to be monitored be marked thereby allowing monitoring and allocating memory to save diagnostic results. Marking of ladder logic is performed by inserting an instruction mark that is comprised of two inputs and two outputs, which indicate the occurrence of certain events.

U.S. Pat. No. 5,949,676 (hereby incorporated by reference) describes a diagnostic system wherein a diagnostic engine detects timing patterns comprised of a trigger event, result event, and time duration between trigger and result, wherein a relationship between the trigger event and result event has been previously defined. Statistical analysis is performed on the timing patterns to produce a diagnostic rule that is updated per the timing patterns detected.

U.S. Pat. No. 5,870,693 (hereby incorporated by reference) describes a diagnostic system wherein a diagnostic computer is connected to a PLC running a ladder logic program. While running, the PLC generates at least three types of data: (1) change of time information CNT, whose value is incremented in response to a change of any one of the relays corresponding to a plurality of outputs monitored by the PLC; (2) output data OUT, which is comprised of 1 bit that represents the relevant output corresponding to each relay; and (3) channel change frequency CM, which is the number of times of changes of each output and is incremented in accordance with the output data OUT. In use with the diagnostic computer, the PLC communicates the CNT, CM and OUT data for one complete cycle. Upon the machine being controlled reaching a halt, the user may press a key to download the CNT, CM and OUT data at the time of halt. The diagnostic computer then performs various analysis steps. First, it compares the stored CM data with the halt CM data to see if they are the same. If they are the same, it means that the PLC program has failed to move to the next step and then, by comparing the halt CM data with the stored CM data at the next data change time point, it can be determined which output has failed to change state. If the stored CM data is different from the halt CM data, an output failed to change state. To determine which output the halt CM data is compared to the stored preceding change time CM data. See Cols. 9 and 10 for a detailed explanation of diagnosis operations.

While each of the above-described patents has been somewhat useful in determining the cause of an error or failure within a machine or process, they present the user with a complex system that is, of its ownself, difficult to learn and implement.

As such, there is a need for a diagnostic tool that will provide the diagnostician a clear view of a machine or process at precisely the time that a failure occurs as well as provide a clear description of the normal sequence of events for the current mode of operations so that an error may be easily detected. The diagnostic tool will preferably provide these features without requiring the addition of logic to an existing control program and without requiring the establishment of multiple relationships between inputs and outputs.

SUMMARY OF THE INVENTION

The needs described above are in large measure addressed by a computerized machine control (CMC) diagnostic system of the present invention. The system communicates with a computerized machine controller that utilizes a control program to control the operation of a machine through the use of a plurality of digital channels. In general terms, the system includes a data acquisition component, a data storage component and a viewing component, each of which is in communication with the other.

The data acquisition component queries and acquires time-based transition data about the plurality of digital channels. The data storage component stores the acquired transition data in order to establish an historical pattern of the transition data that can be compared to currently acquired, or real-time, transition data. The historical pattern of transition data is established independently of the control program. Upon comparison of the current transition data to the expected, historical pattern of transition data, a determination about the operational status of the machine being controlled can be made. The operational status can then be displayed on the viewing component.

The data storage component may additionally act as an analysis component whereby analysis is performed on the acquired transition data. By performing this analysis, it can be determined by the system whether the machine being monitored has experienced a downtime event. In the case a downtime event has occurred, the analysis component develops an inventory, preferably in the form of a prioritized list, of which of the digital channels likely caused the downtime event. The prioritized list is developed independently of the control program of the computerized machine controller. The inventory may then be displayed on the viewing component.

Beyond downtime event detection, the analysis component may additionally determine whether one of the digital channels has experienced an unexpected transition that did not result in a downtime event, i.e., an intermittent failure. As with downtime event detection, intermittent failure detection is determined by the system of the present invention without any knowledge of the control program in the computerized machine controller.

By storing transition data and establishing patterns of the transition data, various displays on the viewing component may be produced. One of these displays is in the form of a sequence diagram. The sequence diagram is produced in relation to each of the digital channels and generally comprises an historical, expected transition data area and a current transition data area.

Still another type of display that may be produced on the viewing component includes a machine start-up assistance screen or other type of transition data sub-set assistance screen, e.g., shut-down. In the instance of a start-up sub-set, start-up transition data is acquired and stored to establish an expected historical pattern of start-up transitions for the digital channels. The historical pattern can then be compared with current start-up transition data and a display produced indicating whether there is match between the two sets of data.

Yet another type of display that may be produced by the system of the present invention on the viewing component is that of a machine status display. The operational status of a machine is preferably displayed in the form of a stack-light that is color-coded to indicate different operational statuses. In a preferred embodiment, numerous machines and/or virtual machines have been defined and are monitored by the system of the present invention allowing the user to have a simultaneous overview of each machine, or virtual machine, status by presenting a stack-light for each machine on a single display.

BRIEF DESCRIPTION OF THE DRAWINGS

FIG. 15 is an example of an I/O view-startup screen of the CMC diagnostic system of the present invention.

DESCRIPTION OF THE PREFERRED EMBODIMENTS

A computerized machine controller (CMC) diagnostic system of the present invention is described hereinbelow. The CMC diagnostic system operates to acquire and monitor status changes in the input/output (I/O) tables of a PLC controlled machine or process. The system determines whether the current I/O tables of the machine or process have deviated from the expected status and provides notice to the user of such a deviation. If the deviation has resulted in a machine or process shut-down, the system operates to provide the user with an indication of the most probable cause of shut-down. The CMC diagnostic system provides the user with numerous additional tools to aid in the efficiency of monitoring and running the machine or process to which CMC diagnostic system is applied. It should be noted that the term machine is used in a generic sense and connotes a complete machine, a subset thereof (virtual machine), or a combination of different machines.

I. System Components

Figure 1:
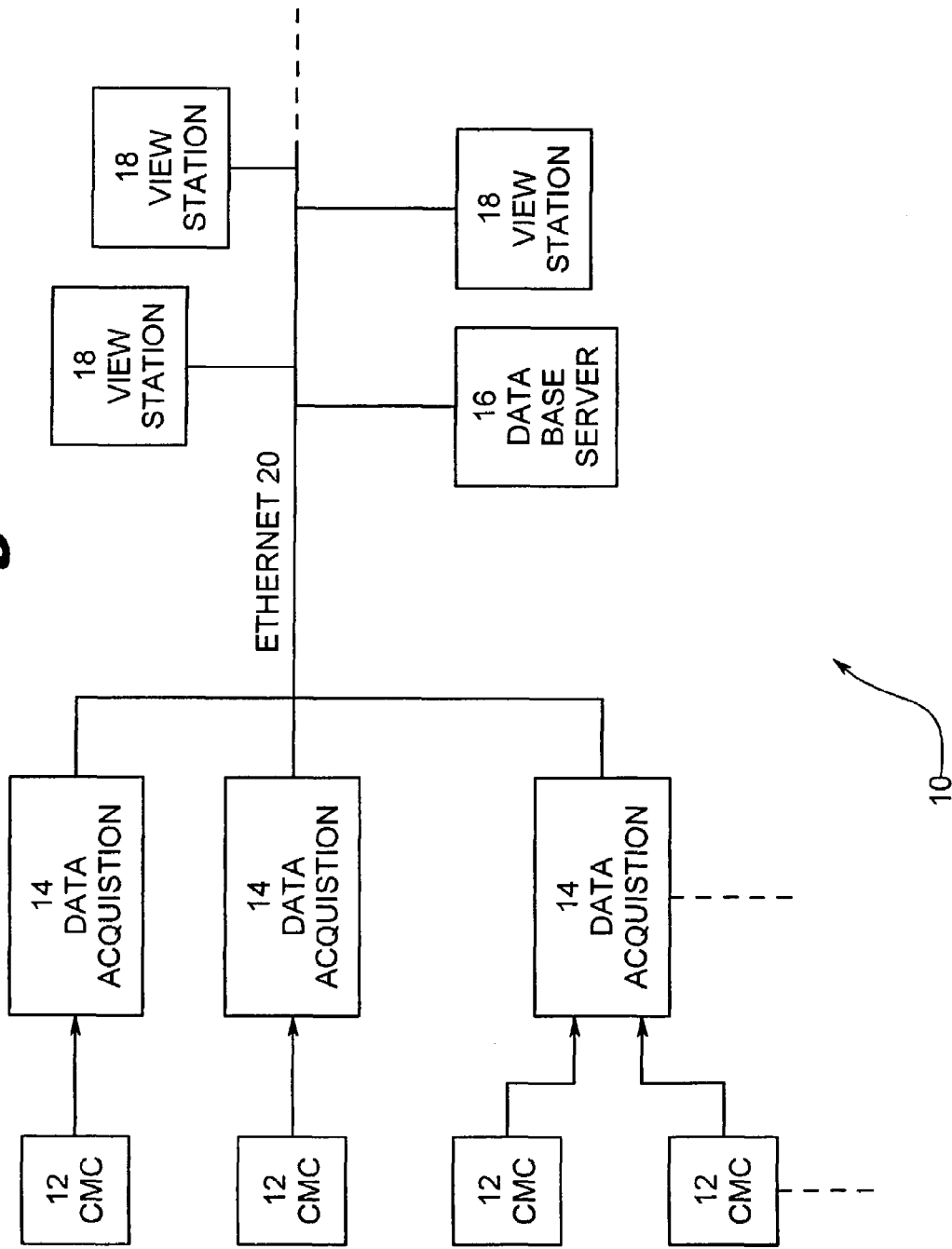
FIG. 1. is a block diagram depicting the computerized machine controller (CMC) diagnostic system of the present invention.

FIG. 1 provides an overview of CMC diagnostic system 10 of the present invention. As shown, system 10 is designed to communicate with one or a plurality of computerized machine controllers (CMCs)12, which are directing the operation of a process, machine, or a portion of a process or machine. System 10 is preferably connected to each of machine CMCs 12 through a high-speed ethernet connection 20, other appropriate connections, per the requirements of the CMC, and/or existing machine network; the higher the connection speed the better system 10 is able to perform. CMCs 12 may be from a common manufacturer or from various manufacturers, e.g., Allen-Bradley, Modicon, Siemens, SquareD, etc. Each of the various types of controllers have established communications software and hardware making it possible for system 10 to communicate. Additionally, system 10 is able to communicate with various CMCs due to the fact that it is a pattern-based system rather than a language-based system that must be specific to the programming language of the controller.

In the preferred embodiment, system 10 is generally comprised of three hardware components: (1) a data acquisition computer 14; (2) a database server 16; and (3) a viewing computer 18. One or more of each of the three components may be utilized as the control system application dictates. Further, it should be noted that the three hardware components are more appropriately thought of as functional blocks or components, existing on one or more computers as necessary. For example, a portable unit containing system 10 may comprise a single computer containing the three functional blocks. Further, it should be noted that while a personal computer (PC) can be used for each of the three functional blocks, special purpose computers, processors, cards, e.g., cards placed on the back plane of the CMC 12 or otherwise attached to existing computers, may be used without departing from the spirit or scope of the invention.

Data acquisition computer 14 interfaces with one or more of CMCs 12 using the controller manufacturer's, or other, communication protocol to communicate as often as possible with the processor (not shown) of CMC 12. The main function of data acquisition computer 14 is to query CMC 12 to obtain the status of the input and output tables, or some subset of the input and output tables, and to time and date stamp the transitions occurring in the input and output tables. Data acquisition computer 14 may also query to obtain register and analog data. Additionally, data acquisition computer 14 also functions to transfer the acquired data to database server 16 for storage and to viewing computer 18 for viewing of real-time data.

Database server 16 operates a relational database management system (RDBMS). The main function of database server 16 is to hold and organize the system configuration, machine configurations, and historical runtime information, and to allow data acquisition computer 14 and viewing computer 18 to access and modify this data as appropriate.

Viewing computer 18 allows for monitoring of a machine or process through the data obtained from CMC 12. The main function of viewing computer 18 is to display real-time and historical data, allow for user configuration of system 10, and provide the ability to print desired data. As such, viewing computer 18 is preferably provided with peripherals including keyboard, monitor, printer, and/or other peripherals suitable to the system application. It should be noted that viewing computer 18 may comprise a portable computer or home computer equipped to dial into system 10 allowing for remote monitoring of the machine or process.

The statistical analysis performed by system 10 may be performed on any, a combination of, or all of data acquisition computer 14, database server 16 or viewing computer 18. Additionally, it should be noted that because three computers are preferably used with system 10 there is an ability to configure the computer power, i.e., the hardware, as appropriate to fit a specific application. For example, tasks generally performed by one computer can be shifted to another if appropriate and feasible, reducing the computer power required by at least one of the computers.

II. System Operation

PLC diagnostic system 10 utilizes four basic modes of operation that are implemented through the execution of software by the hardware components described above. The four basic modes of operation are: (A) a data collection mode 30; (B) a reference analysis mode 40; (C) a diagnostic run mode 50; and (D) a downtime detected mode 60. The modes of operation run simultaneously for the monitoring of the on-going operations of the machine or process to which system 10 is applied.

A. Data Collection Mode

Figure 2:
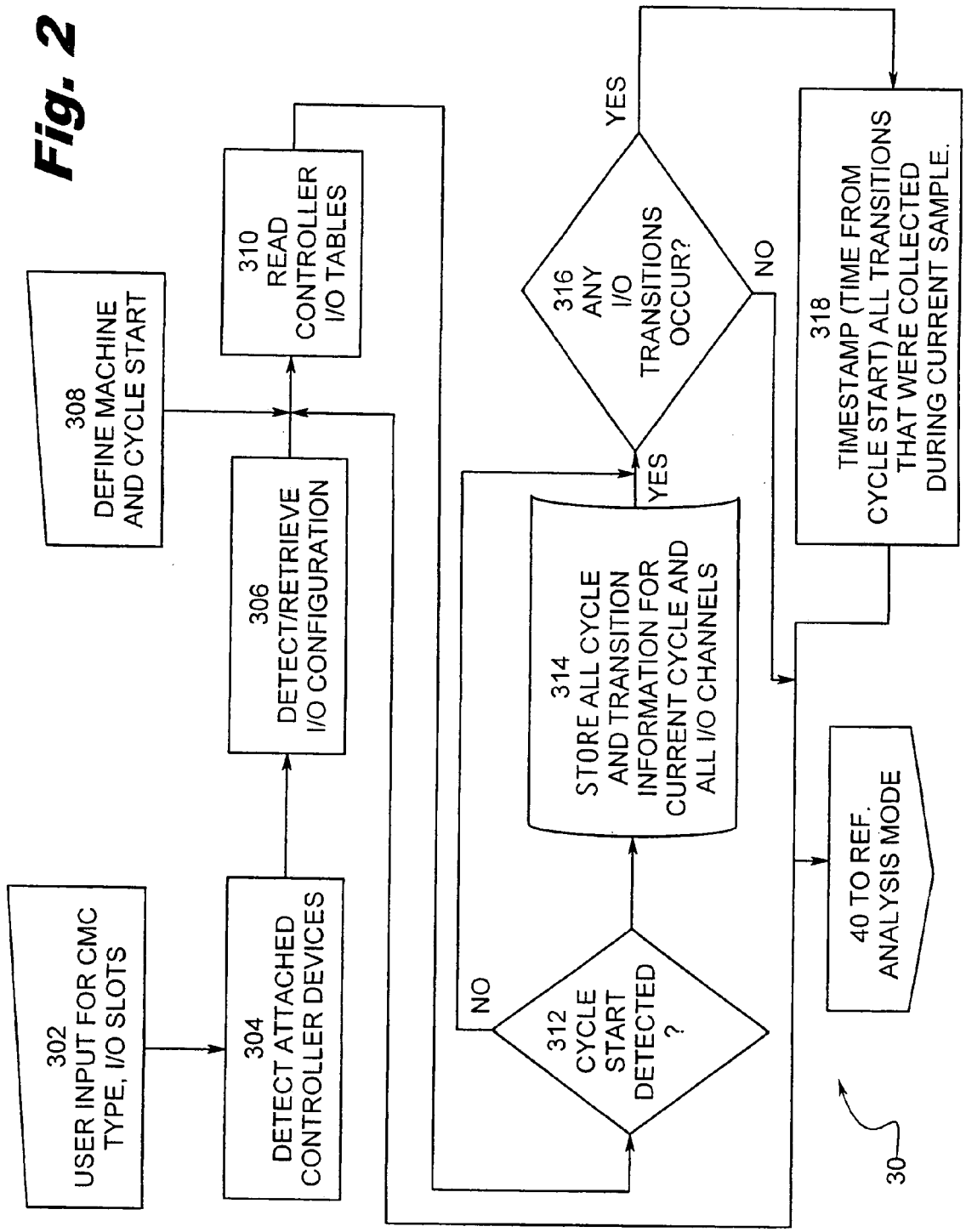
FIG. 2 is a flow chart of a data collection mode of the CMC diagnostic system of the present invention.

The data collection mode 30 is used by system 10 to collect machine cycle and signal data that will be used in generating various reference data sets. The primary function of this mode is to detect a transition of the reference output signal, i.e., cycle start, and to time-stamp all other input and output transitions relative to the transition of the reference output signal. All transition data is then stored to the relational database on database sever 16. FIG. 2 is a flow chart detailing the operational steps of data collection mode 30.

As shown, the first step in data collection mode 30, per input block 302, is for the user to configure system 10 by entering information about each CMC 12 to be monitored by system 10. In the preferred embodiment, the user designates the type of CMC 12, e.g., by selecting the manufacturer and model, the total number of I/O slots available to CMC 12, and the mode of communication to be used between data acquisition computer 14 and CMC 12, e.g., RS232, RS485, DH+, Modbus, etc.

With information about the type of CMC 12 to be monitored by system 10 entered, system 10 operates to detect the presence of each CMC 12, per operations block 304. System 10 queries each possible node location on the system network, through the designated mode of communication, to determine if a CMC 12 is available. If CMC 12 is indeed available, additional CMC processor identification information is retrieved from CMC 12 and stored in a table in database server 16. The identification information available from a CMC is dependent on the CMC make and model. The data is typically available in memory registers or data tables.

System 10 then detects and retrieves the I/O configuration of each of CMCs 12, per operations block 306. Data acquisition computer queries each CMC 12, through the designated mode of communication, to determine all of the input and output bits, or channels, that are available for reading. The information regarding the input and output bits are stored in an automatically generated table in the relational database of database server 16. In a preferred embodiment, the user is then allowed to add, edit and/or delete I/O channels as desired and F appropriate to the application. Additionally, the user is preferably allowed to enter and/or import signal names associated with each input and output bit. If no signal name is entered or imported, system 10 preferably defaults to identifying each input and output bit by its detected slot/module number and bit number, e.g., "Mod1-Input00, Mod1-Input01," etc.

With all CMCs 12 and their corresponding I/O identified within the communication network of system 10, the user is requested to identify the I/O that will define a machine to be monitored by system 10 and to additionally identify the cycle start for each machine, per input block 308. With regard to identifying the I/O that will define a machine, the user may choose all inputs and outputs to define the machine or may choose any subset of the inputs and outputs that are available for reading. The I/O that may be chosen is obtained by system 10 by reading an CMC export file in controller specific format or by manually defining the I/O.

The ability to select a subset of inputs and outputs allows the user to essentially define a virtual machine. This concept allows system 10 to treat different machines controlled by the same CMC 12 as truly separate machines and allows different phases of a large machine or process to be monitored separately by system 10. Additionally, the ability to select a subset of inputs and outputs allows the user to designate different modes of operation of the same physical machine so that each mode of operation may be monitored separately.

This ability is especially important in a process involving numerous operational stations, and transfers between stations, that are controlled by a single CMC. In such a situation, each operational station and each transfer may be identified as a virtual machine within system 10 allowing the user to monitor each operational station and each transfer separately. The ability to monitor each operational station and each transfer separately allows the user to determine more accurately which operational station or transfer has caused the first problem in a shutdown.

With regard to cycle start, it is defined as the signal that is used to define the start of the machine cycle (it may also designate the completion of a previous cycle) and is the signal from which the time of transition for all other inputs and outputs is measured. Cycle start is a reference datum from which system 10 may establish a pattern of cycle transitions against which future cycle transitions may be compared. System 10 preferably allows only one input or output to be defined as the cycle start for each defined machine or virtual machine. Alternatively, cycle start may be defined as simply a time interval or any arbitrary choice of an input or output that provides the desired reference datum.

As additional user input, per input block 308, the user may define an automatic signal or may define a signal to be ignored. With regard to an automatic signal, any input or output signal may be optionally defined as the automatic signal. System 10 will only collect and analyze data during the time when the automatic signal is on; having no automatic signal defined preferably results in system 10 continuously collecting data. With regard to ignoring a signal, this property is selected when the user wants data from a signal to be collected by system 10 but not analyzed. As such, system 10 will not check the ignored signal for abnormal conditions or display the signal as a potential cause of downtime. The ability to ignore a signal is useful when the signal is not repeatable relative to the machine cycle. Alternatively, system 10 can be programmed to automatically ignore a signal if the signal transitions only a certain percentage of time and that percentage is below a user-defined threshold for the machine, e.g., if a signal transitions only 20% of the time in a cycle and the user threshold is set to ignore signals that transition 40% of the time or less in a cycle, the 20% signal would be ignored.

Further user input is preferably requested per input block 308. Specifically, the user is also preferably asked to input a maximum cycle time; maximum cycle time is the number of seconds specifying the maximum possible cycle time of a machine or process and is the number that is used by system 10 to detect downtime (described below) when no accurate reference is available. The user is also preferably asked to input a sample interval. The sample interval is the number of milliseconds between data collector reads of the CMC's I/O tables, this number is limited by the selected communication mode. The user is also preferably asked to input a downtime threshold, which is a percentage of a known good cycle time that is a threshold to detect downtime, and to input the number of days for which system 10 should store actual I/O and cycle data. The user is also preferably asked to input a subgroup value, which is a value that will be utilized during the statistical analysis that is performed by reference analysis mode 40 (described below).

Following the flow of FIG. 2, the next step in data collection mode 30 is to read the I/O tables of each CMC 12, per operations block 310. As the I/O is being read, system 10 determines whether the identified cycle start has transitioned, e.g., the cycle start output has transitioned from 0 to 1, per decision block 312. Once the cycle start has been detected, all cycle and transition information for each of the I/O channels for the current cycle is stored in records (e.g., one record per 16 I/O channel) in the relational database, per stored data block 314. If no cycle start is detected, system 10 continues to monitor the I/O channels for the cycle start transition.

After storage of the I/O data from the current cycle, system 10 determines whether any of the I/O have transitioned from the last cycle, i.e., an input or output has changed state from 0 to 1 or 1 to 0, per decision block 316. If I/O transitions have occurred, the transitions are time-stamped, i.e., the time as measured from the cycle start to the occurrence of the transition of the input or output, and the time-stamped information stored in the relational database according to the I/O channel, per operations block 318. Once the time-stamp information has been created and stored, or if no I/O transitions have occurred, data collection mode 30 loops back and looks again for a transition of the cycle start thereby creating a continuous loop of data collection. With one or more cycles stored by data collection mode 30, operation in reference analysis mode 40 may begin.

B. Reference Analysis Mode

Figure 3:
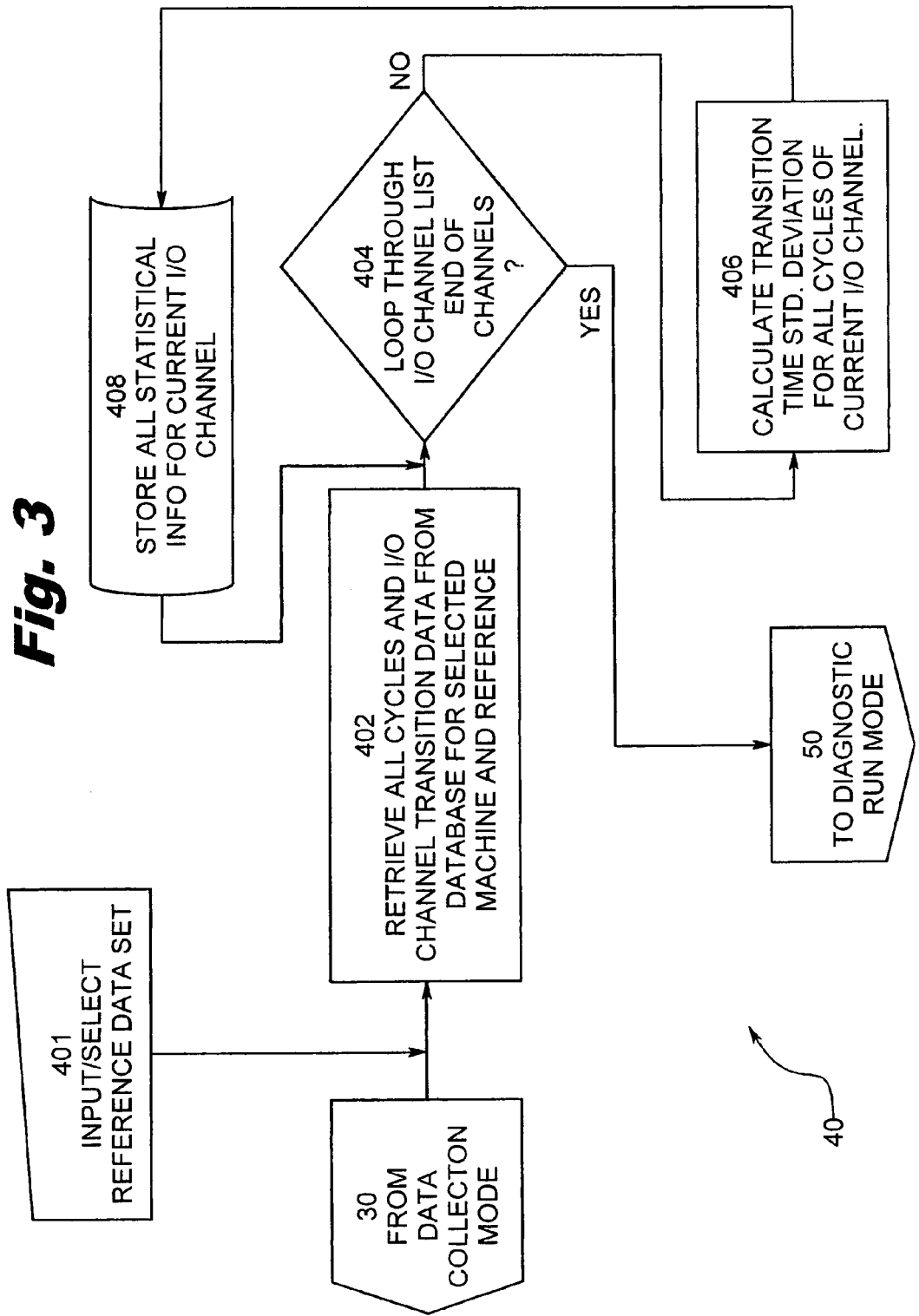
FIG. 3 is a flow chart of a reference analysis mode of the CMC diagnostic system of the present invention.

The main function of reference analysis mode 40 within system 10 is to calculate statistical values for each input and output channel transition. These statistical values are then used during diagnostic run mode 50 to determine if statistically significant transition deviations have occurred. With a statistically significant transition deviation, the calculated values are then used to determine the likelihood of other signals causing the detected transition deviation. FIG. 3 is a flow chart detailing the operational steps of reference analysis mode 40.

As shown, upon shifting from data collection mode 30, reference analysis mode 40 requests that the user input or select the stored cycles for the machine, or virtual machine, that will create a reference data set to which all other cycles may be compared, per input block 401. Reference data sets that might be chosen include, but are not limited to:

1. The last machine cycle.
2. The previous 10 machine cycles.
3. The previous 100 machine cycles.
4. The previous 500 machine cycles.
5. A group of 100 machine cycles specially selected because they represent good machine operation.
6. A set of 100 reference cycles set when the machine is new.
7. A set of 100 machines cycles set by the manufacturer.

Figure 10:
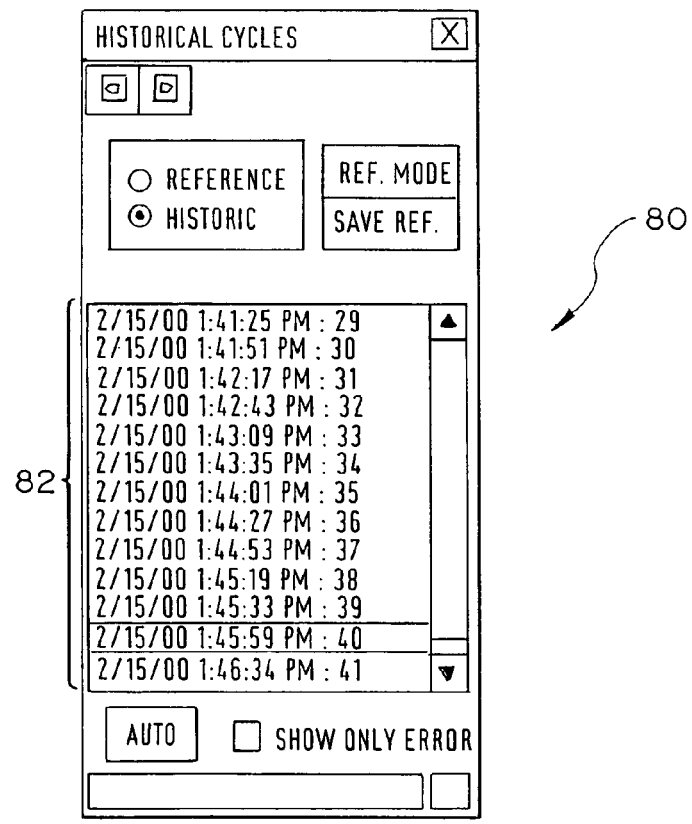
FIG. 10 is an example of an historical cycles screen of the CMC diagnostic system of the present invention.

The user preferably selects the machine cycles by viewing a screen, see FIG. 10, wherein the time-date stamp of a cycle and its cycle number are presented. The user must have some familiarity with the machine, or virtual machine, operation to know at this early stage which of the cycles are good cycles to be used in the reference data set.

Beyond simply selecting certain cycles to comprise the reference data set, a user may alternatively designate that the reference data set bet generated by system 10 as the statistical average of cycles for a user-defined number of cycles. Additionally, a user may operate under a fixed reference data set or a dynamic reference data set. A fixed reference data set is one in which the cycles to be used for a statistical average calculation are pre-selected. A dynamic reference data set is one in which system 10 continually recalculates, by statistical average calculation, the reference based on the last X number (a user-defined variable) of good cycles. In this instance, a good cycle is deemed to be any cycle that matched with the current reference data set.

Following the flow of FIG. 3, it can be seen that reference analysis mode 40 next operates to retrieve the stored cycles that comprise the reference data set and the I/O channel transition data of each of those cycles from the relational database for a selected machine, process, or subset thereof, per operations block 402. System 10 then operates to loop through the I/O transition data for each input and output channel in each cycle of the reference data set, per decision block 404, and to calculate the standard deviation of the transition time for each input and output channel, per operations block 406.

In the preferred embodiment, the standard deviation of the transition time for each input and output channel is calculated using the subgroup value, which was previously entered by the user, and a random number generator. An example of such a calculation is provided below:

1. Presume that a user has input that the number of cycles to be present in a reference data set is 100, and that 100 cycles of transition time data for each input and output channel have been taken.
2. Presume that a user has input a subgroup value of 5 (any desired value may be entered).
3. For each input and output channel, presume that there are now 100 samples of transition times since there have been 100 cycles (note that in actual operation there may be more or less than 100 samples of transition times since an input or output channel may transition more than once in a cycle or may not transition each cycle; a standard deviation calculation is performed for each transition. For each input and output channel use the random number generator to select 5 (the subgroup value) transition times from the 100 samples available and store them as a subgroup. Repeat this step until all of the transition time data samples for the input or output channel are placed within a five-member subgroup, or until there are not enough transition time data samples to form a five-member subgroup.

4. For each five-member subgroup calculate the mean transition time according to Equation (1):

$$x_i = \frac{\sum_{n=1}^{m} t_n}{m} = \frac{\sum_{n=1}^{5} t_n}{5} \qquad \text{Eq. (1)}$$

where:
- $x_i$=the mean transition time for the subgroup
- m=the subgroup value or the number of members in the subgroup
- $t_n$=the transition time of the nth member of the subgroup.

5. For each input or output channel calculate the mean transition time according to Equation (2):

$$\bar{x} = \frac{\sum_{k=1}^{l} x_{i_k}}{l} \qquad \text{Eq. (2)}$$

where:
- $\bar{x}$=the mean transition time for the input or output channel
- l=the number of five-member subgroups
- $x_{i_k}$=the mean transition time of the kth five-member subgroup.

6. For each input or output channel calculate the transition time standard deviation according to Equation (3):

$$s = \sqrt{\frac{\sum_{z=1}^{l}(x_{i_z}-\bar{x})^2}{l-1}} \qquad \text{Eq. (3)}$$

where:
- s=the transition time standard deviation for an input or output channel
- l=the number of five-member subgroups for an input or output channel
- $\bar{x}$=the mean transition time for the input or output channel
- $x_{i_z}$=the mean transition time for the zth five-member subgroup.

It should be noted that subgroups are used to force a normal distribution of the data. Mathematicians have determined that the averages of properties of subgroups taken from a population are normally distributed. This is true even if the population itself is skewed and does not follow the rules of a normal distribution. If the average of subgroups are used, statistical properties of normal distributions may be used to analyze the data.

Alternatively, the use of subgroups may be eliminated if the reference data set that is being utilized not of a sufficient size. If the size of the selected reference data set is small, the use of subgroup standard deviation statistical analysis may not be feasible, i.e., there are not enough samples to use the subgroup approach. For example, if the user has designated the single last machine cycle as the reference data set, subgroup standard deviation statistical analysis cannot be performed since the number of data samples may be as low as five; a population of five members is too small to apply the statistical analysis. As such, when small reference data sets are selected, averages and ranges of the entire population are used and a threshold of some number of data samples that must be taken before statistical analysis is applied is set.

In such a situation the transition time standard deviation for each input or output channel is calculated according to Equation (4):

$$s = \sqrt{\frac{\sum_{i=1}^{n}(x_i-\bar{x})^2}{n-1}} \qquad \text{Eq. (4)}$$

where:
- s=the transition time standard deviation for an input or output channel
- $x_i$=the transition time for the ith data sample for the input or output channel
- n=the number of data samples $$\bar{x} = \frac{\sum_{i=1}^{n} x}{n} = \text{the mean transition time of the } n \text{ data samples.}$$

While standard deviation is the preferred type of statistical analysis used with system 10, it should be noted that other methods of statistical analysis may be used without departing from the spirit or scope of the invention.

Upon completing the statistical analysis of transition times for an input or output channel, per operations block 406 of FIG. 3, the statistical analysis data is stored in the relational database, per stored data block 408. Reference analysis mode 40 then continues its statistical analysis until each input and output channel has been analyzed and its data stored. When all input and output channels have been statistically analyzed, reference analysis mode 40 is deemed complete and the operation of system 10 is transferred to diagnostic run mode 50. Note that if the reference data set has been selected by the user to be a dynamic reference data set, as described above, reference analysis mode 40 is a continually ongoing process.

C. Diagnostic Run Mode

Figure 4:
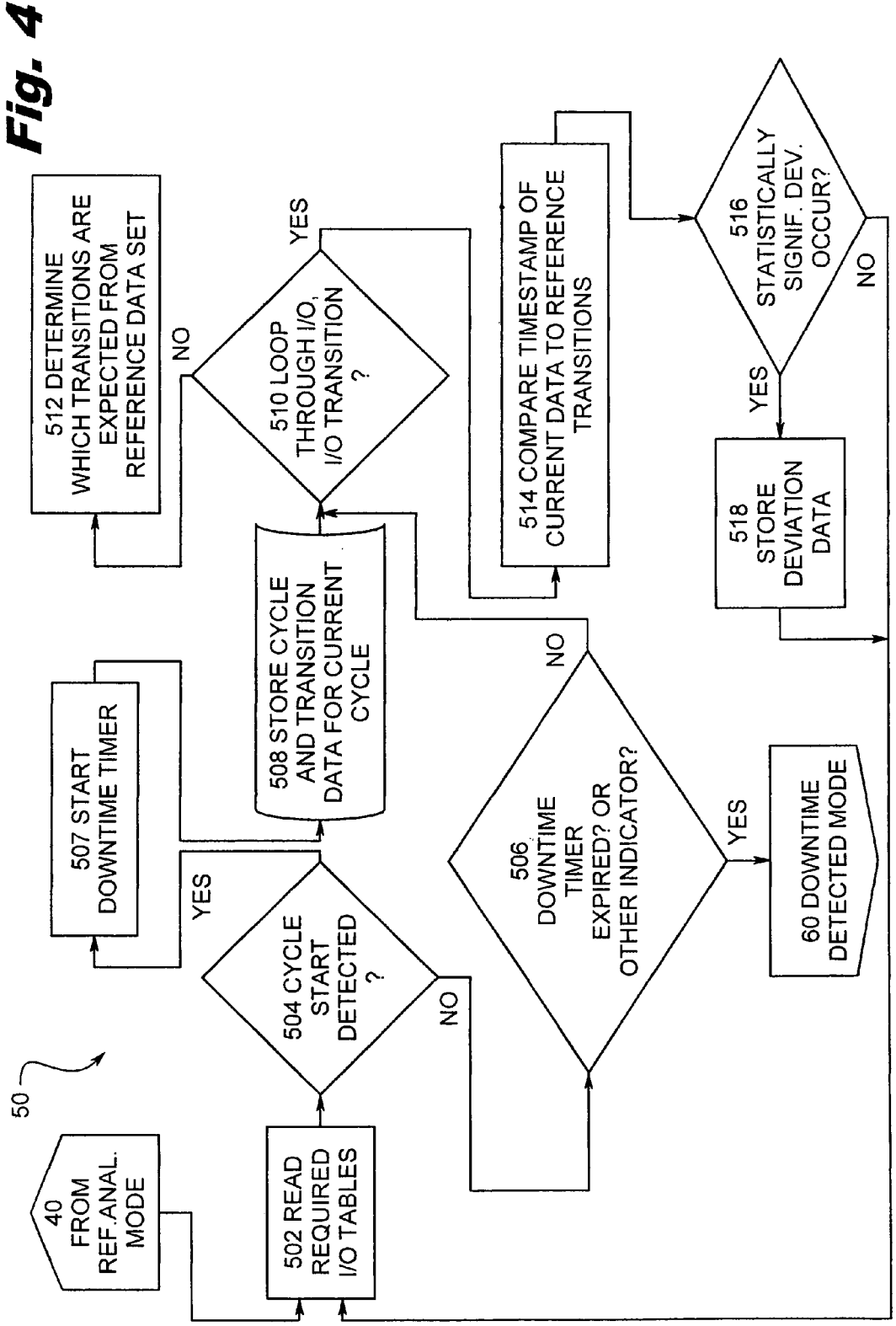
FIG. 4 is a flow chart of a diagnostic run mode of the CMC diagnostic system of the present invention.

The main function of diagnostic run mode 50 within system 10 is to compare current data (input and output transition times) of the selected machine, or virtual machine, against the expected input and output transition times, as determined from the reference data set and the statistical analysis previously performed thereon. FIG. 4 is a flow chart detailing the operational steps of diagnostic run mode.

As shown, upon transfer of the operation of system 10 from reference analysis mode 40, diagnostic run mode 50 operates to read the current I/O channels of CMC 12, per operations block 502. The current I/O channels read are the same as those identified to comprise the machine or virtual machine. Following the flow of FIG. 4, the next step in diagnostic run mode 50 is to determine from the read I/O channels whether the cycle start has transitioned, per decision block 504. If the cycle start has not transitioned and the maximum cycle time (a user-entered value described above) has expired, operation of system 10 is shifted to downtime detected mode 60, per decision block 506. The maximum cycle time is timed by an internal downtime timer that is started upon detection of cycle start, per operations block 507. Alternatively, the internal downtime timer, rather than timing to the maximum cycle time, can time to a user-defined percentage of the average reference cycle time, which is calculated by system 10. For example, if the average reference cycle time is calculated to be 1.3 seconds and the user has entered a percentage of 20%, the internal downtime timer reaching a time of 1.56 seconds would indicate a downtime event and system 10 would shift to downtime detected mode 60.

The operation of system 10 may also shift to downtime detected mode 60 if other indicators of downtime are detected, per decision block 506. For example, diagnostic run mode 50 may look to see if a signal that has been selected by the user to indicate a cycle end has transitioned but has fallen out of its statistical window, e.g., has fallen out of its $\bar{x}\pm3$ s window. Other downtime indicators may be used without departing from the spirit or scope of the invention.

If the transition in cycle start has occurred, the transitions for each I/O channel in the current cycle are time-stamped and are stored to the relational database, per stored data block 508. The stored data of the current cycle is then scanned to determine if, in fact, any transitions in the I/O channels have occurred, per decision block 510. If any transitions in the I/O channels have occurred, the time-stamp transition data of the current I/O channels is compared to the expected time transition data, i.e., the mean transition time for the I/O channel, $\bar{x}$, as calculated and stored in reference analysis mode 40, per operations block 514. If no transitions in the I/O channels have occurred, the current I/O channel data is compared to the expected time transition data of the reference data set, per operations block 512.

After the comparison performed under operations block 512 or operations block 514, diagnostic run mode 50 determines whether a statistically significant deviation has occurred in the current I/O channel transition times, or non-transition times, as compared to the reference data set transition times, per decision block 516.

Under standard deviation statistical analysis utilizing data or subgroups of data with a normal distribution, it is known that probabilities indicate that 99.97% of the data will fall within plus/minus three standard deviations plus the average, i.e., with reference to the values calculated under reference analysis mode 40 above, 99.97% of the time-stamped transition times for each I/O channel will fall within $\bar{x}\pm3$ s. As such, under decision block 516, if any of the following conditions have occurred, a statistically significant deviation is deemed to have occurred: (1) the initial state of the I/O channel, i.e., state at cycle start, is different than the state of the corresponding I/O channel in the reference data set at cycle start and, referring back to the previous cycle, the I/O channel had not transitioned as expected by falling into an acceptable statistical time window that extends beyond cycle start, e.g., an input is expected to transition to "1" at 1.5 seconds and its statistical time window extends the time out to 1.7 seconds, yet the next cycle start is expected at 1.65 seconds wherein the status of the input should be "1"—a transition at 1.7 seconds would, allowing a "0" at cycle start, would not be a deviation, however a transition falling outside of an expected time window causing the status a cycle start to be different than expected would be a deviation; (2) the current I/O channel transition occurred unexpectedly based on the reference data, e.g., the current I/O channel transition occurred too early (the transition time fell outside of $\bar{x}-3$ s), the current I/O channel transition occurred too late (the transition time fell outside of $\bar{x}+3$ s), or an additional unexpected transition of the I/O channel occurred; (3) the current I/O channel transition was expected but did not occur, e.g., there is a zero second time-stamp for the current I/O channel which therefore causes the transition time to fall outside of x+3 s.

If it is determined that one or more of the above-described statistically significant deviations has occurred, the deviation is noted in the relational database, per operations block 518. The operation of diagnostic run mode 50 is then returned to operations block 502 wherein the next current cycle of I/O channel transitions is read and it is determined whether cycle start has occurred, per decision block 504. If the cycle start has not been detected and the downtime timer has not expired (or another indication of down time has not been detected), per decision block 506, the operation of diagnostic run mode 50 is directed to decision block 510 whereby the last cycle analyzed is still in memory and the next I/O channel is checked for transitions and then compared according to operations block 512 or 514. In this manner, the non-expiration of the downtime timer is allowing diagnostic run mode 50 to look for other I/O channels that have failed. The downtime timer continues to run until it times out indicating a machine down.

If it is determined that a statistically significant deviation has not occurred, the operation of diagnostic run mode 50 is returned directly to operations block 502 for the next read of I/O channel transitions. Diagnostic run mode 50 continues running, logging all I/O channel transitions, time-stamps, and statistical information for the I/O channel, until the downtime timer has expired and the operation of system 10 is transferred to downtime detected mode 60. The logging of I/O channel data enables system 10 to be capable of regenerating the state of machine, process, or subset thereof, at any point in time, a feature whose value will be further understood with reference to the system analysis tools described below in section III.

It should be noted that diagnostic run mode 50 may additionally be used to monitor and determine deviations of analog data that has been retrieved from CMC 12. For example, diagnostic run mode 50 can be programmed to recognize that at a certain time in a cycle an analog signal should be at a certain value, or within an acceptable statistical range of that value, based on the stored reference data set. Alternatively, diagnostic run mode 50 can be programmed to recognize that an analog signal should be at a certain value, or within an acceptable statistical range of that value, at a certain I/O channel transition.

D. Downtime Detected Mode

Figure 5:
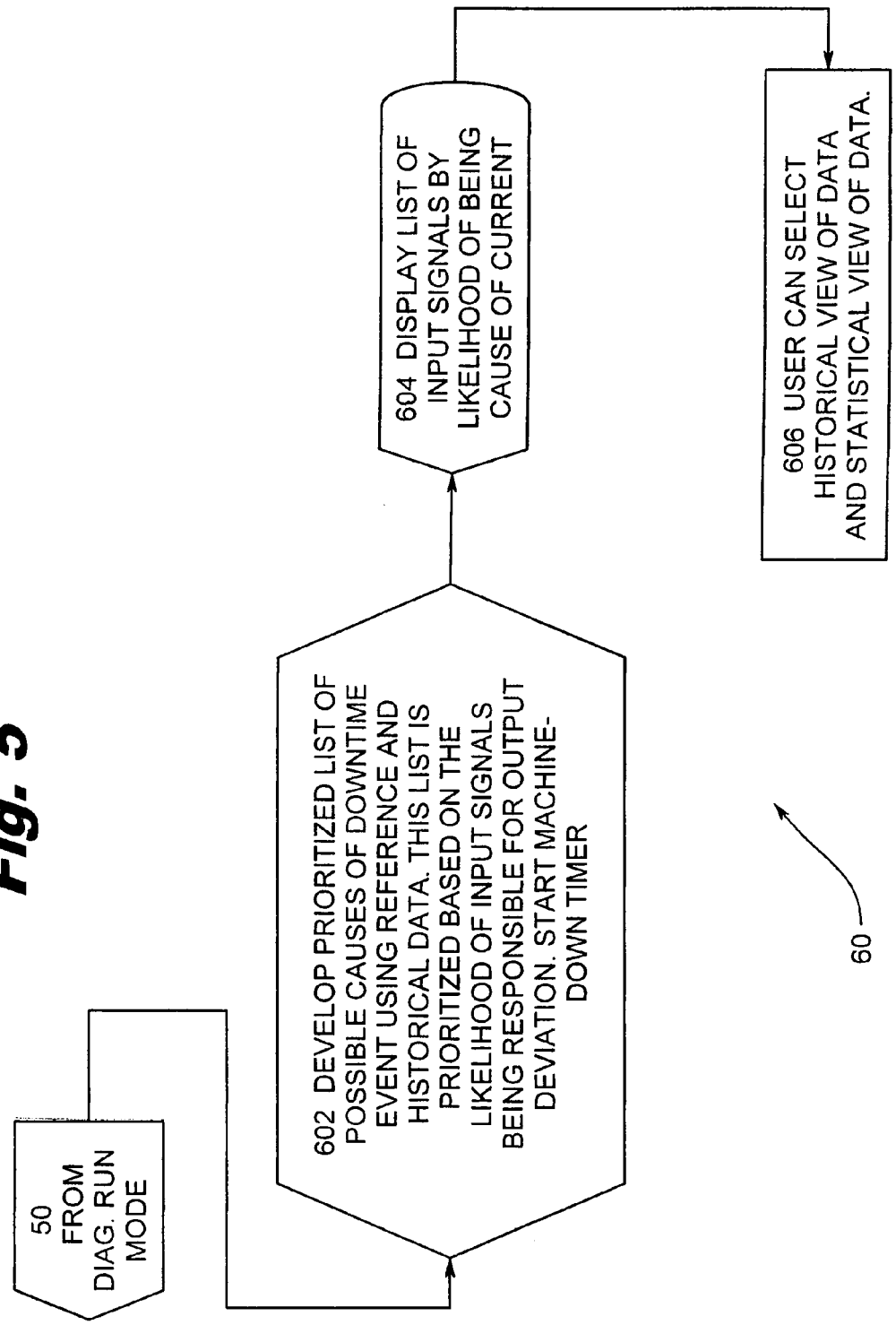
FIG. 5 is a flow chart of a downtime detected mode of the CMC diagnostic system of the present invention.

The main function of downtime detected mode 60 is to produce a display for the user indicating what deviation has occurred and indicating the most likely cause or a prioritized inventory or list of the most likely causes of the downtime on one of view stations 18. FIG. 5 is a flow chart detailing the operational steps of downtime detected mode 60.

As shown, upon shifting from diagnostic run mode 50, downtime detected mode 60 operates to develop a prioritized list of possible causes of the downtime event, per preparation block 602. The list is prioritized based on the likelihood of input channels being responsible for an output channel deviation. Specifically, diagnostic run mode 50 keeps a log in the relational database of the status of the I/O channels at all times and, in particular, at the precise time an output deviation occurs. As such, downtime detected mode 60 can determine the time sequence of abnormal inputs as they occurred prior to an output deviation and machine downtime. Additionally, an internal machine-down timer is started to time the length of the machine down event.

As a simple example of determining the likely cause of downtime, reference is once again made to the simple drill press that was described in the Background of the Invention. At the time the drill press was to clamp a part, the input table appeared as follows:

| Input Number | 0 | 1 | 2 | 3 | 4 | 5 | 6 | 7 |
|---|---|---|---|---|---|---|---|---|
| Status | 0 | 1 | 0 | 0 | 0 | 1 | 0 | 0 |

Since input one (indicating the part has been sensed within the machine fixture) must always be "on" for the clamp to operate, there is a unitary probability that input one must be on at this point. At the time of the first noted failure of the part sense proximity switch, the input table would appear as follows:

| Input Number | 0 | 1 | 2 | 3 | 4 | 5 | 6 | 7 |
|---|---|---|---|---|---|---|---|---|
| Status | 0 | 0 | 0 | 0 | 0 | 1 | 0 | 0 |

Downtime detected mode 60 can now report that there is a high probability that the failure of input one was cause of the current episode of downtime.

Figure 6:
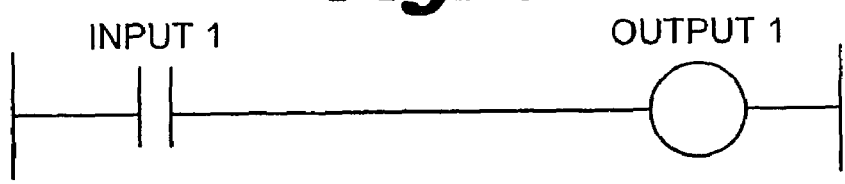
FIG. 6 is an example of simple ladder logic.
Figure 7:
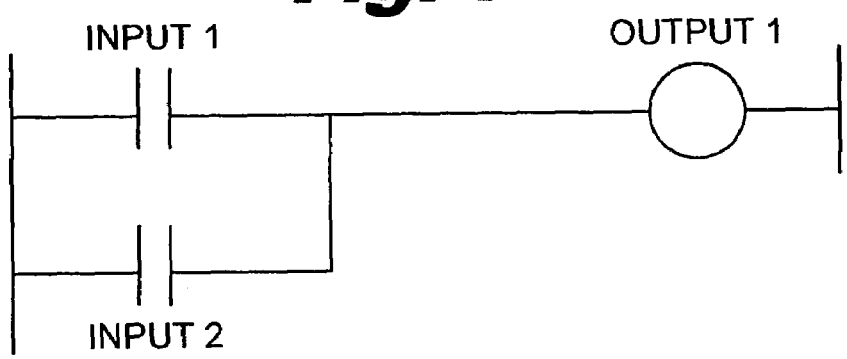
FIG. 7 is an example of simple "or" ladder logic.
Figure 8:
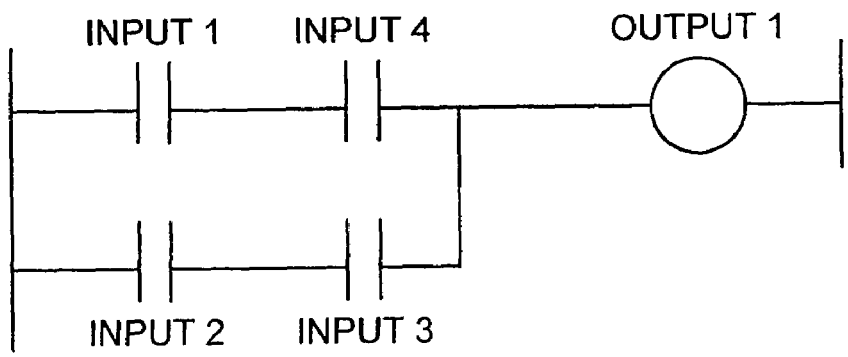
FIG. 8 is an example of complex "and" and "or" logic.

The CMC logic encountered in the field will often be more complex than the simple example cited above; there will be instances of "or" logic and "and" logic. Conventional representation of the Boolean logic in controllers is often made using ladder logic. A ladder logic representation of the simple logic of the drill example might be shown as in FIG. 6. In this instance of ladder logic, a single normally open contact (input 1) operates a single output (output 1). However, often more complex logic, like the "or" ladder logic of FIG. 7, is encountered. The ladder logic of FIG. 7 shows that either input one "or" input two can activate output one. An even more complex example of ladder logic may be found in FIG. 8. In this instance, either inputs one "and" four, "or" inputs two "and" three can activate output one. The complexity of the logic in CMCs on the factory floor goes far beyond the examples cited here, however, by using statistical analysis of the I/O channels' status downtime detected mode 60 can make inferences on probable causes without specific information on the logic itself, i.e., no user-entered relationships between input channels and output channels are required.

Specifically, preparation block 602 of downtime detected mode 60 determines the probability, i.e., the likelihood, of an input causing an output deviation by utilizing a two level sorting routine:

First Level: Sorting by probability percentage. The probability percentage represents the likelihood that a certain input channel will make a certain transition during a cycle. This probability percentage is based on the transitions that occur for that input channel in the reference data set. For example, if the reference data set comprises 10 cycles and an input makes a certain transition in each of those cycles, the probability percentage that that certain input channel should transition is 100%. If the certain input channel transitioned only eight times in the 10 cycles, the probability percentage that that certain input channel should transition is 80%, etc., (number of first transitions/number of cycles)* 100%. By this sorting level, those inputs with the highest percentage are listed first.

Second Level: Sorting by time sequence. In the instance that the first sorting level produced equivalent percentages, e.g., there are three inputs with statistically significant deviations and each has a probability percentage of 100%, the input that is expected to transition first by time, as determined from the reference set data, is listed as the most likely cause of shut down with the others following in expected time sequential order or the input that transitions unexpectedly by time, as determined from the reference set data, is listed as the most likely cause of shut down with the other following in expected time sequential order. If no inputs have equivalent probability percentages, the sorting is based on percentage only with the input having the highest percentage being the most likely cause of shut down. Additionally, the list of inputs are preferably marked, e.g., by an asterisk, if they have occurred within a pre-defined time window of the shutdown. The time window may be user-entered or determined by system 10. As such, in those situations where the cause of down is not the first occurring input deviation but the first occurring deviation closest to the down, i.e., the first deviation occurring in the time window prior to down, will be marked for user reference.

Additionally, the analytical scheme examines the I/O channels and looks for inputs and outputs that are always either on or off without regard to a specific transition of an output. These could be such things as a safety door limit switch that is always on except when the door is opened. These types of signals are reported separately according to their probabilities.

Referring once again to FIG. 5 and the operation of downtime detected mode 60, it can be seen that once preparations block 602 has developed and stored a prioritized list of possible causes of downtime, that prioritized list is then displayed on one of viewing computers 18, per block 604.

Figure 9:
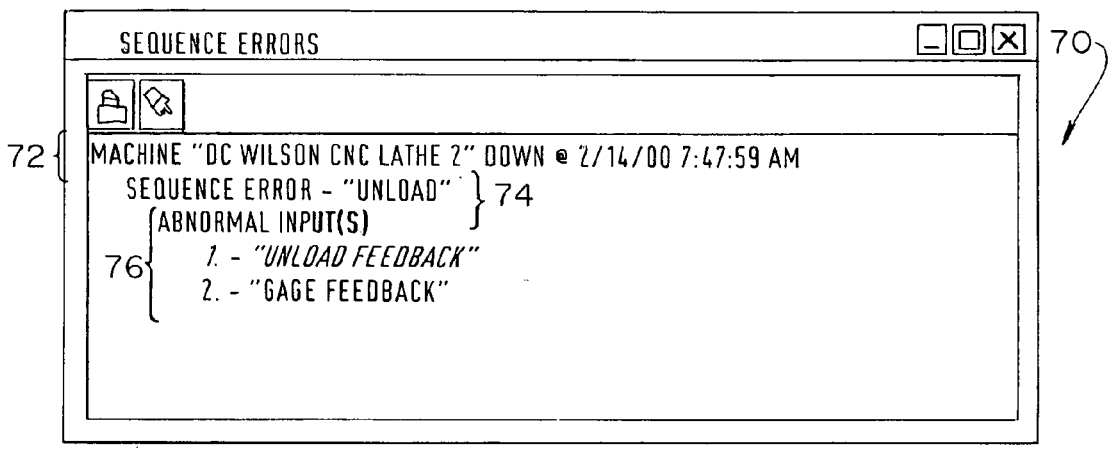
FIG. 9 is an example of a sequence error screen of the CMC diagnostic system of the present invention.

The prioritized list is preferably displayed in the form of a sequence error screen 70, an example of which is depicted in FIG. 9, and includes a machine field 72, a sequence error field 74, and an abnormal input field 76. Machine field 72 preferably provides the name of the machine and a date/time stamp of when the machine went down. Sequence error field 74 preferably provides a listing of the output deviation errors in chronological order. Abnormal input field 76 preferably provides a listing of input channel deviation errors in order of likelihood of causing an error. Sequence error screen 70 preferably appears automatically when a deviation from the expected sequence, as determined by the standard deviation statistical analysis of diagnostic run mode 50, is detected. As such, when a machine maintenance technician arrives at the machine and notes the display, the technician may proceed immediately to the listed deviations and effect a repair with a minimal amount of time. Note that if the machine, process, or subset thereof, does not go down, sequence error screen 70 may describe only one or more deviations from the expected sequencing.

Returning again to FIG. 5 and the operation of downtime detected mode 60, it can be seen that along with providing a prioritized list of possible causes of downtime, per block 604, downtime detected mode 60 additionally preferably provides the user with the option of selecting an historical view of the cycle data and a statistical view of the data used in the standard deviation statistical analysis, per operations block 606.

The historical view of the cycle data is preferably presented in an historical cycles screen 80, an example of which is shown in FIG. 10. Historical cycles screen 80 preferably includes a list box 82 that is filled with time-stamps and cycle numbers of all cycles for the current machine, process, or subset thereof, that are stored in relational database. The listing of cycles is preferably color-coded, or otherwise marked, to indicate which of the listed cycles were good cycles, i.e., no deviations occurred, which were cycles where deviations took place but did not cause machine shut down (intermittent failures have occurred), and which were cycles where deviations took place that caused a machine shut down. The user is preferably provided with the option of listing within list box 82 only those cycles with deviations or only those cycles with downtimes.

Figure 11:
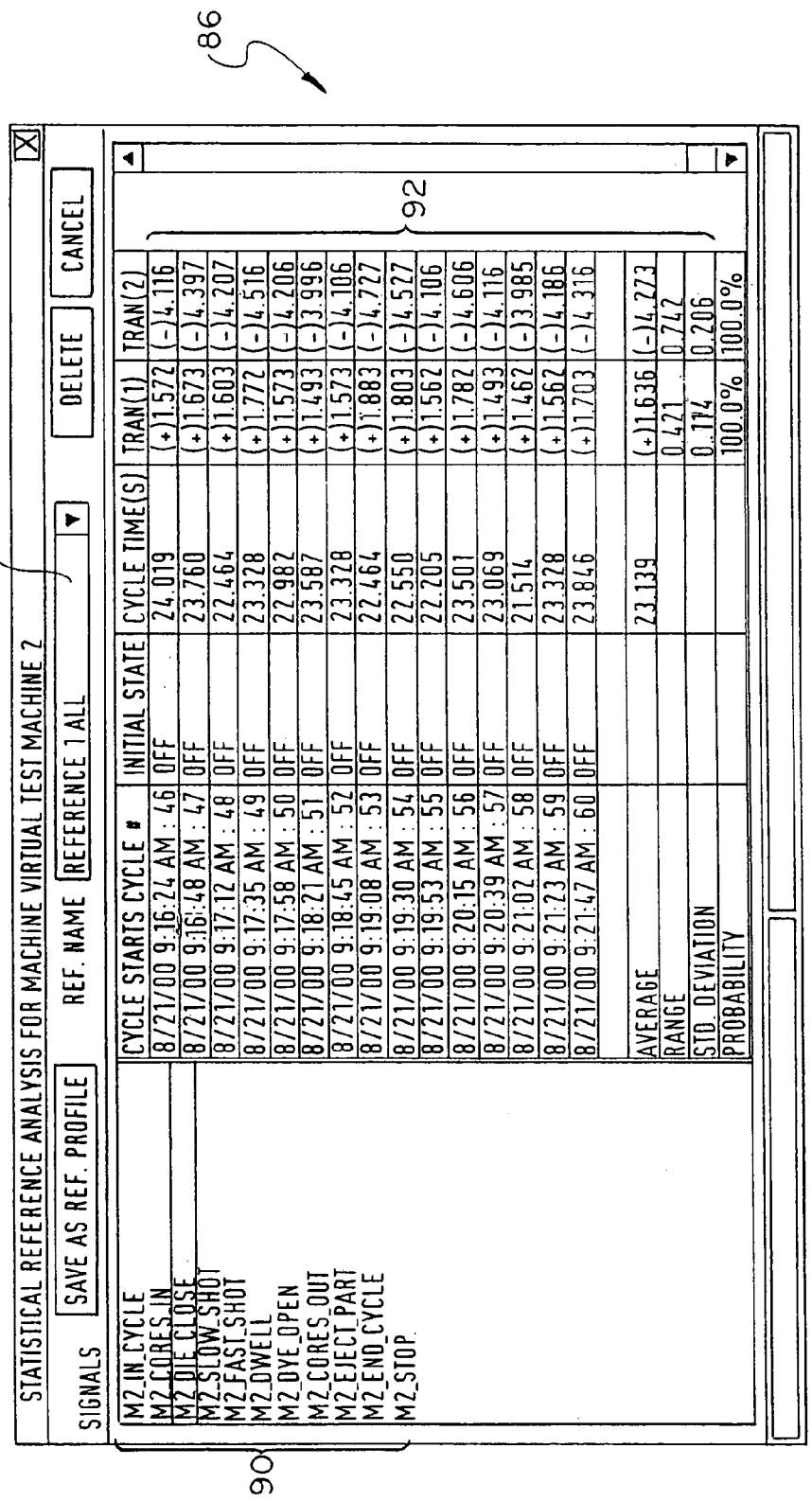
FIG. 11 is an example of a statistical reference analysis screen of the CMC diagnostic system of the present invention.

The statistical view of the data used in the standard deviation statistical analysis is preferably presented in a statistical reference analysis screen 86, an example of which is depicted in FIG. 11. Statistical reference analysis screen 86 preferably includes a reference data set selection field 88, a signal list field 90, and a statistics field 92. Reference data set selection field 88 preferably includes a listing of all available reference data sets that the user has defined and allows the user to select one of those reference data sets for the machine or virtual machine being monitored. Signal list field 90 preferably provides a name listing of each of the I/O channels within the selected reference data set. Statistics field 92 preferably provides all the relational database stored transition information for a selected I/O channel (selected from signal field list 90) for all cycles contained in the selected reference data set. Specifically, statistics field 92 preferably includes the cycle number as well as the date and time of the cycle start, the initial state of the selected I/O channel at cycle start, the length of time of the cycle ("Cycle Time"), and the time, as measured from cycle start, that the I/O channel transitioned. In the instance of FIG. 11, the selected I/O channel transitions twice during the cycle, as indicated by the Trans(1) and Trans(2) fields. Additional transition fields are produced as appropriate to the number of transitions of the I/O channel. An indicator of whether the transition was from 0 to 1, e.g., "+", or from 1 to 0, e.g., "−", is also included.

Statistics field 92 also preferably includes the average, range, standard deviation (calculated under diagnostic run mode 50), and probability percentage that a certain transition for a selected I/O channel is expected to transition. In FIG. 11, since both the first transition of the I/O channel and the second transition of the I/O channel occurred in all cycles, the probability percentage that each of those transitions should occur is 100%, e.g., (number of first transitions/number of cycles)*100%.

III. Additional System Features and Analysis Tools

While the above-described modes of operation within system 10 provide the user with a valuable tool allowing the user to quickly determine the most likely cause of a shut down and thereby effect a quick repair, the functionality and usefulness of CMC diagnostic system 10 can be expanded by implementing additional features and analysis tools that take advantage of all of the information that is stored in the relational database. These additional features include input and output sequence diagrams, start-up assistance, a downtime event log, machine status indicators, and a CMC view screen. Each of these features are preferably available at all times during operation of CMC diagnostic system 10. Those features and/or tools that involve the use display screens provide those display screens on one or more of viewing computers 18.

A. Sequence Diagrams

1. Real-Time Monitoring

Figure 12:
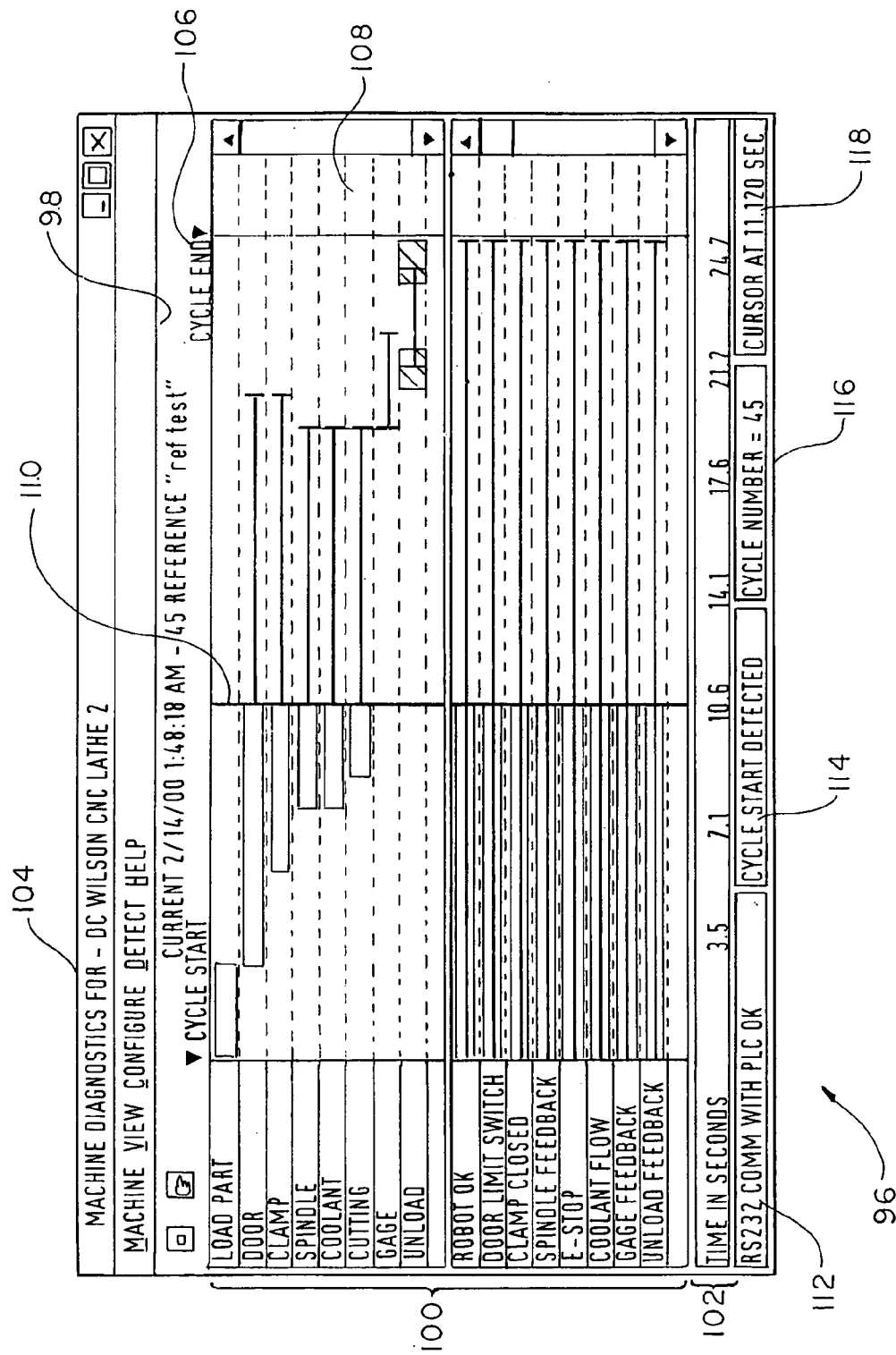
FIG. 12 is an example of a live sequence diagram of the CMC diagnostic system of the present invention.

Based on the automatic extraction of relational database stored I/O channel information, transition times, standard deviation statistical analysis data, and other cycle data, CMC diagnostic system 10 is preferably able to produce a live on-line sequence diagram for each I/O channel, or some selected subset thereof. An example of a live sequence diagram 96 is depicted in FIG. 12. Each sequence diagram 96 preferably includes a current/reference cycle indicator 98, an I/O channel name/I/O channel location display 100, a time axis 102, a cycle start indicator 104, a cycle end indicator 106, an I/O channel transition display window 108, and a time cursor 110. Sequence diagram 96 may additionally include a communication status indicator 112, a cycle start detection indicator 114, a cycle counter 116, a time from cycle start indicator 118 for time cursor 110.

Current/reference cycle indicator 98 preferably displays the date and time-stamp of the currently displayed live cycle as well as the name of the reference data set that is being used for the statistical analysis. I/O channel name/I/O channel location display 100 is a listing of the names, which have been imported or user-entered, for each I/O channel. Alternatively, display 100 is a listing of the system-defined I/O channel location, e.g., I: 013/11 or 10003, which are programmable logic controller specific formats. In the preferred embodiment, the user is able to toggle between the name and the location, which facilitates quicker identification of the location of the I/O channel on the machine being monitored.

Time axis 102 provides an indication, in seconds, of the time elapsed from cycle start at a certain point along the axis. If the machine that is being monitored is a repeatable cycling machine, time axis 102 preferably spans one machine cycle. Alternatively, some arbitrarily defined time period from cycle start may be defined for time axis 102; an arbitrarily defined time period may be desirable for continuous processes. Cycle start indicator 104 is placed relative to time axis 102 at time=0.0 second while cycle end indicator 106 is placed relative to time axis 102 such that it corresponds to the current or last known live cycle time.

I/O channel transition display window 108 preferably provides an indication of the expected transition and duration of the transition as well as an indication of the current transition and duration of an I/O channel. With respect to the expected transition and duration, this is preferably indicated through the use of two vertical lines and a horizontal line connected therebetween. The leftmost vertical line is the point where the I/O channel is expected to transition, or turn on, and also represents the average transition time of the I/O channel, i.e., $\bar{x}$, calculated as described above. The rightmost vertical line is the point where the I/O channel is expected to transition again, or turn off, and represents the average of the second transition time of the I/O channel. As such, the horizontal line connecting the two vertical lines represents the expected duration of the transition of the I/O channel. Each vertical line may be surrounded by a box to show the standard deviation range for the transition time, e.g., $\bar{x}\pm3$ s (other deviations 1 s, 6 s, etc., may be set as desired), calculated as described above. An example of such boxes are shown on the "unload" input of FIG. 12.

With respect to the current transition and duration of an I/O channel, it is preferably represented by a bar that overlays the horizontal line of the expected duration. The leftmost side of the bar is the point at which the I/O channel transitioned, or turned on, in the current cycle. The bar extends for the duration of the transition until the I/O channel transitions again, as indicated by the rightmost side of the bar, and turns off. If operating normally, the current transitions of the I/O channel should fall within the transition time standard deviation of $\bar{x}\pm3$ s. Whether or not the transition does fall within the standard deviation range can be easily observed if the standard deviation boxes, described immediately above, are used.

Time cursor 110 is preferably a vertical line that scrolls across the screen in real time describing the current status of the I/O channels. Additionally, time cursor 110 is preferably provided with the ability to be dragged by the user, left and right, to a desired location, whereby the location of time cursor 110 from cycle start is shown in time from cycle start indicator 118.

Communication status indicator 112 tells the user that the communication established between system 10 and CMC 12 is functioning or not functioning. Cycle start detection indicator 114 tells the user whether the cycle start has been detected or whether system 10 is still waiting for the cycle start. Cycle counter 116 indicates the number of cycles that have occurred since machine start. And, time from cycle start indicator 118 for time cursor 110, as described above, simply provides the time axis location, as measured in seconds from cycle start, for time cursor 110.

Sequence diagram 96 is preferably cleared and updated for each new cycle that occurs. Additionally, sequence diagram 96 preferably displays all I/O channels on a single screen in ascending order in relation to transition time or, if not possible, provides the user with the option of a scrolling screen. Alternatively, the user is provided with the option of setting the order of the I/O channels and/or the option of displaying only inputs or only output channels. Color coding of the current time bar according to input or output for easier identification is also preferably provided. Because all data is stored, an historical sequence diagram may also be created by entering or selecting a cycle number for a reference data set or, alternatively, by entering or selecting a date and time for a reference data set whereby the sequence diagram 96 may be regenerated.

2. Downtime Detection Monitoring

Figure 13:
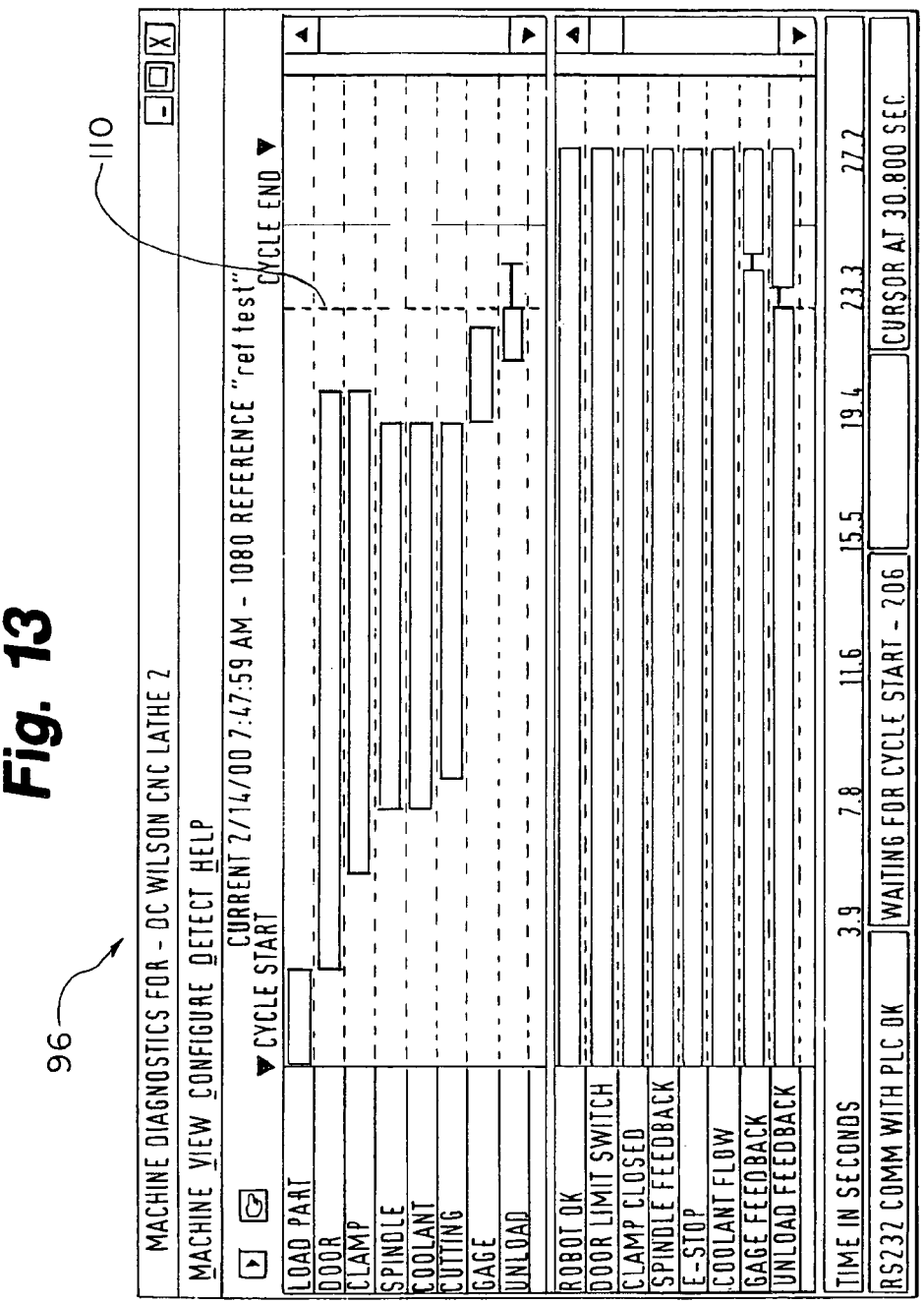
FIG. 13 is an example of a sequence diagram depicting an error in machine operation.

As seen from the description above, sequence diagram 96 provides the user with a real-time visualization of the operation of a machine. However, sequence diagram 96 can also be a valuable tool in providing a visual representation in downtime detection. An example sequence diagram 96 depicting an error in machine operation causing a shut down is shown in FIG. 13. In the instance of a shut down, time cursor 110 precisely marks the time that shut down occurred and, as such, gives a quick visual indication of where a problem likely occurred; in the situation of FIG. 13, the unload input turned off before it was expected to and is likely the cause of the shut down. Upon shut down, time cursor is preferably turned to a dashed line and the names of the I/O channels with deviations are highlighted.

3. Intermittent Failure Monitoring

Figure 14:
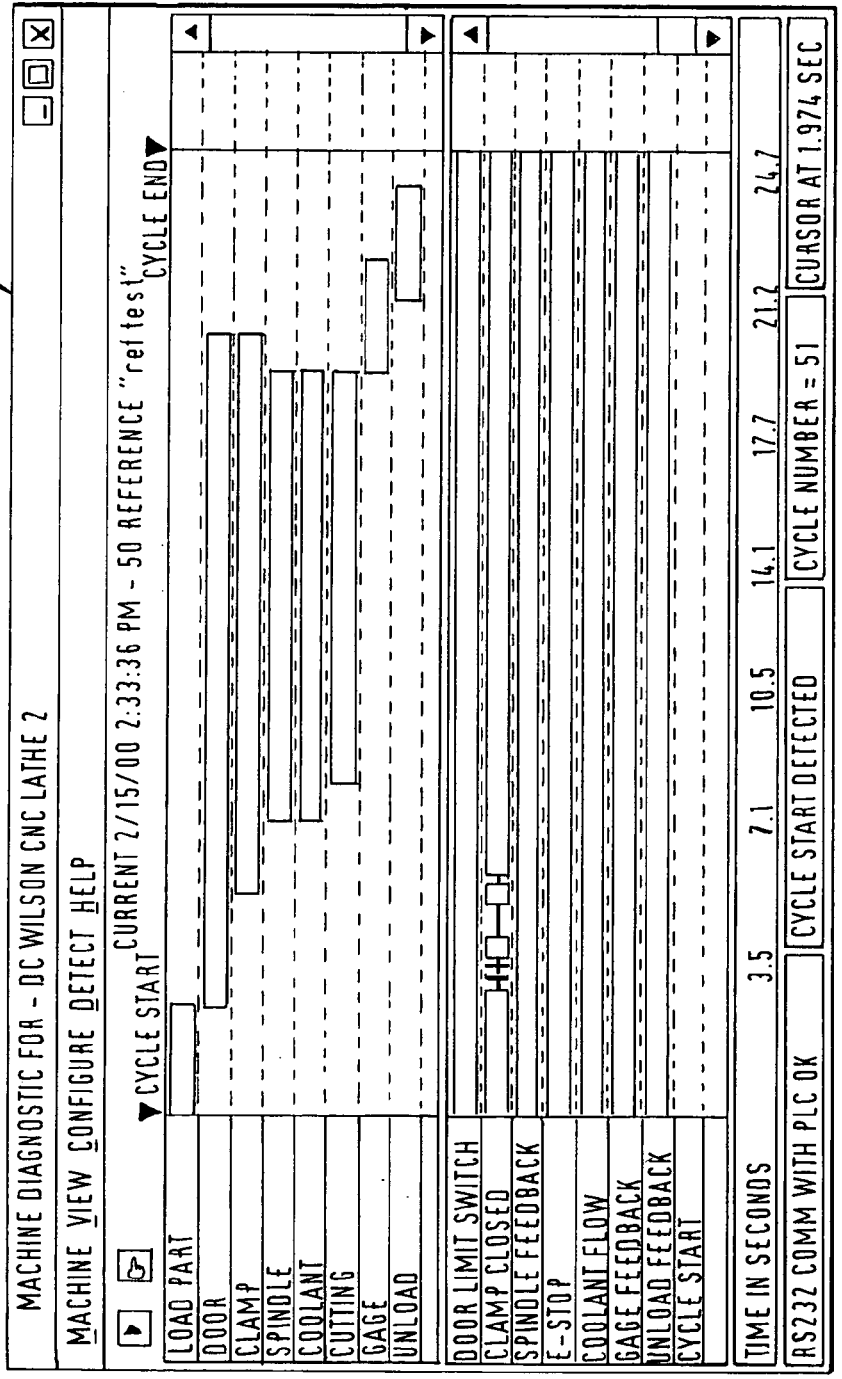
FIG. 14 is an example of a sequence diagram showing the occurrence of an intermittent error.

Sequence diagram 96 may also be used to detect intermittent failures. FIG. 14 is an example of a sequence diagram wherein an intermittent failure is depicted. As can be seen, the machine or process being monitored has continued to run, i.e., no downtime has occurred. However, the "clamp closed" output has transitioned, or flickered, unexpectedly, providing an indication that a device, e.g., a proximity switch, may be failing and should be replaced. The ability to detect intermittent failures allows a user to perform preventive maintenance and ultimately prevent a shut down situation.

B. Start-up Assistance

After a machine shut down, it can sometimes be a long, laborious, exasperating task to get a machine or process up and running again. Especially if the machine or process utilizes hundreds of I/O channels. One input out of hundreds may prevent the start-up of a machine and finding that one input can often be extremely difficult. However, CMC diagnostic system 10 preferably provides start-up assistance by allowing a comparison of the current start-up status of I/O channels against a known good set of data, i.e., against a selected reference data set. This comparison is preferably provided in the form of an I/O View—Startup screen 120, an example of which is shown in FIG. 15.

As shown, I/O View—Startup screen 120 preferably includes a I/O channel name field 122 and a status field 124. I/O channel name field 122 preferably provides a listing of the names of the I/O channels, which have been imported or user-entered, for each I/O channel. Alternatively, I/O channel name field 122 is a listing of the system-defined I/O channel location, e.g., Mod03-Output12. Status field 124 indicates whether the current status of the I/O channel matches the expected status of the I/O channel. The indication is preferably provided in the form of color-coding, a red color-code indicating that the current and expected status do not match and a green color-code indicating that the current and expected status of the I/O channel do match. Other manners of indication may be used without departing from the spirit or scope of the invention.

It should be noted that the start-up assistance screen can be used with any sub-set of machine operation, e.g., shutdown, mode-transfer, etc. The user need only defined those cycles of data that represent the sub-set of operation to act as the reference data set.

C. Downtime Event Log

Figure 16:
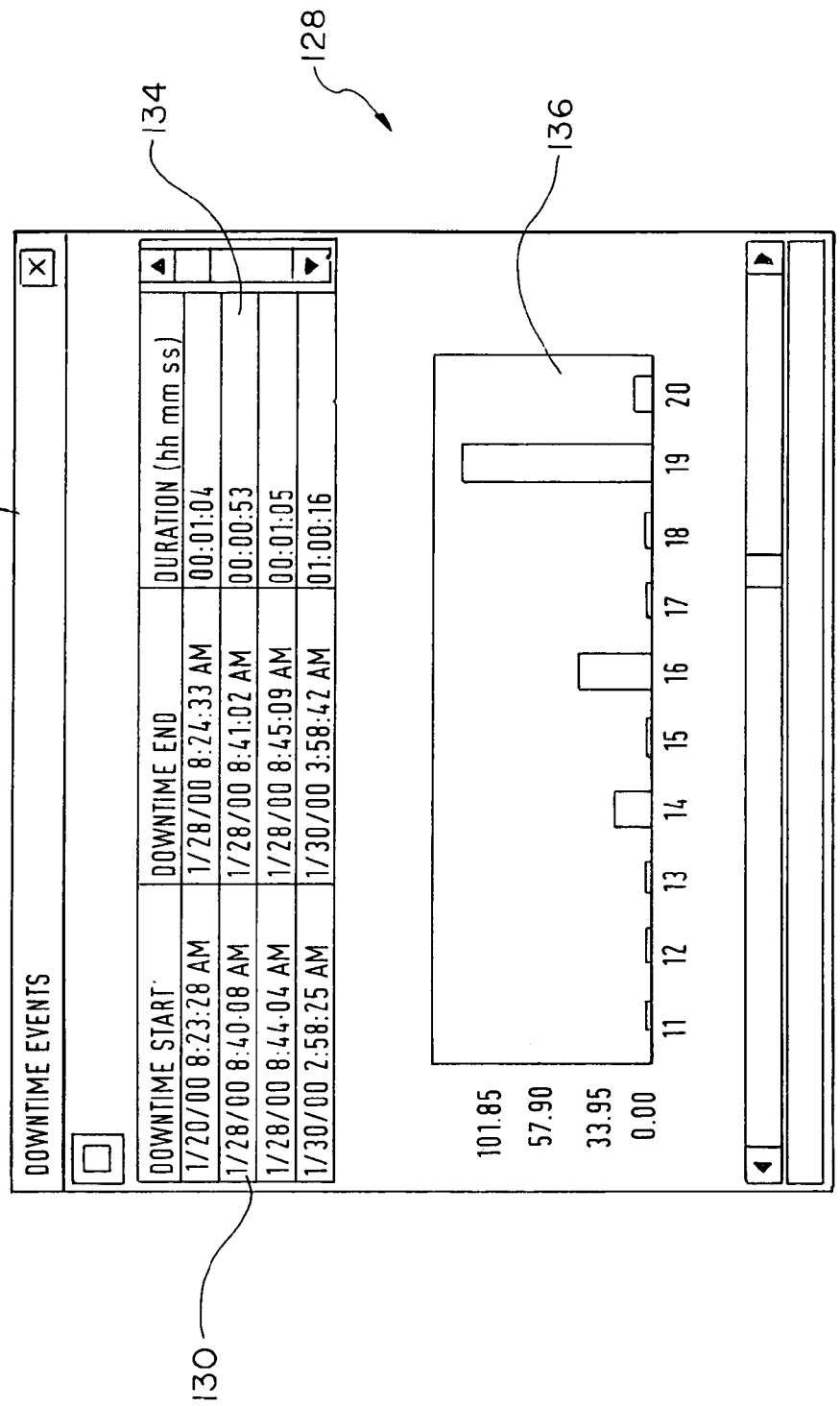
FIG. 16 is an example of a downtime events log screen of the CMC diagnostic system of the present invention.

A downtime event log can be a useful tool in determining the efficiency of operation of a machine or process and in determining the efficiency of repair technician in finding the cause of the downtime by looking at the duration of the downtime event. As such, CMC diagnostic system 10 provides a downtime event log and preferably provides it in the form of a downtime events screen 128, an example of which is shown in FIG. 16. Downtime events screen 128 preferably includes a downtime start field 130, a downtime end field 132, and a duration field 134. The downtime start field 130 provides a listing of the date and time stamp of a machine and process shutdown. The downtime end field 132 provides a listing of the date and time-stamp of a successful startup, i.e., cycle start transitioned and at least one complete cycle occurred without a statistically significant deviation of an I/O channel. If no downtime end is provided it indicates that the machine or process is currently in a downtime state and has not restarted. Duration field 134 shows the duration of the downtime, preferably in the format of hours:minutes: seconds. A bar chart 136 depicting each downtime and its duration may additionally be provided.

D. Machine Status

Figure 17:
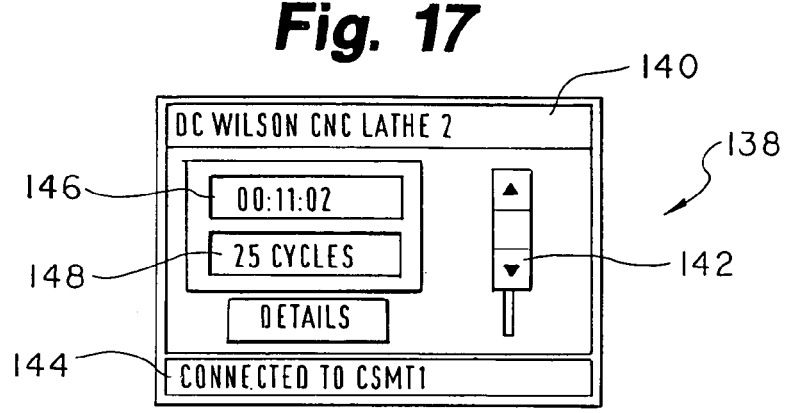
FIG. 17 is an example of a machine status screen of the CMC diagnostic system of the present invention.

To help provide an overall view of the general operational status of each machine, process, or defined subset thereof, i.e., "virtual machine", CMC diagnostic system 10 preferably includes an operational status indicator. The operational status indicator is preferably provided in the form a machine status screen 138, an example of which is shown in FIG. 17. Machine status screen 138 preferably includes a machine name field 140, a three-tiered stack light 142, a communication status field 144, an elapsed time field 146, and a cycle number field 148.

Machine name field 140 lists the user-input machine name that describes the machine, process, or subset thereof, that is being monitored by system 10. Three-tiered stack light 142 is preferably color-coded similar to a stop-light, i.e., having red, yellow and green lights, to provide various indications to the user as to the operation status of the machine. For example, if the machine is down, stack-light 142 is red, if the machine is running, stack-light 142 is green, and if there is communication failure between system 10 and the machine being monitored, stack-light 142 is yellow. Additional indications may be provided by flashing and/or adjusting the brightness of the lights. For example, a bright red stack-light 142 may indicated the machine is down while a dark red stack-light 142 may indicate that the machine is waiting for cycle start. Likewise, a blinking bright red stack-light 142 may indicated that this is the first machine within a large machine system to have failed while a blinking dark red stack-light 142 may indicate an output deviation has occurred in this machine but it is not the first occurrence of a deviation.

Communication status field 144 provides an indication of whether system 10 is communicating with a selected machine's CMC 12. Elapsed time field 146 displays the elapsed time the machine has been in its current state. Cycle number field 148 displays the total number of completed machine cycles since machine start up or, alternatively, from a user-defined time point.

The machine status screens 138 for each machine, process, or subset thereof, are preferably individually displayable and, more preferably, are capable of being displayed simultaneously to provide the user with a quick glance overview of an entire machine operating system.

E. CMC View

Figure 18:
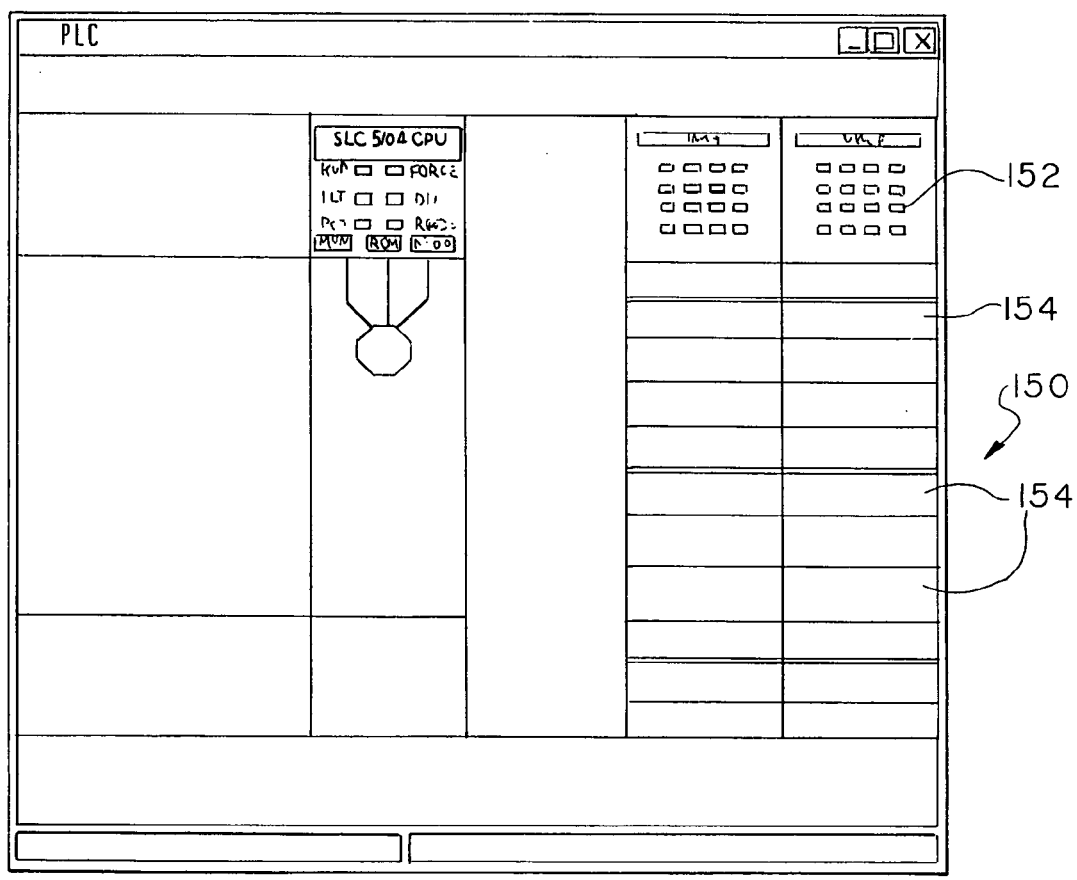
FIG. 18 is an example of a graphic representation screen of a programmable logic a controller of the CMC diagnostic system of the present invention.

As a user-friendly feature, CMC diagnostic system 10 preferably provides the user with a graphical representation screen 150 of each CMC 12 that is being monitored; an example of a graphic representation screen 150 is shown in FIG. 18. Screen 150 provides a live graphical view of the machine's CMC rack(s) and is specific to the CMC type. Individual I/O modules 152 comprise a bitmap representing the static portion of the picture and an array of graphical rectangles 154 corresponding to the LEDs on the I/O module of the CMC 12 and are located accordingly. Each LED graphical rectangle 154 is associated with a bit read from a specific I/O module and, as such, the graphical rectangles 154 are color-coded to indicate when a bit, i.e., I/O channel, is read as "on" or "off". Graphical rectangles 154 are updated per read of CMC 12.

F. Additional Features

1. Long Term Data Storage of CMC Status

CMC diagnostic system 10 is capable of storing CMC I/O data for extended periods of time, a desirable feature considering a CMC itself is generally capable of only storing current information. Because CMC diagnostic system 10 can store data for weeks and even months, at the user's discretion, extensive history of the machine, process, or subset thereof, operation is available to the electricians and technicians that perform trouble-shooting on the machine.

2. Manufacturer Generated Profiles

The manufacturer of machinery can utilize CMC diagnostic system 10 to store CMC data that is developed during the time the machine was being tested and during runoff. This data can then provide a baseline for future comparison within CMC diagnostic system 10 when the machine is installed and not running properly. Input, output, register, and analog tables that are valid at a factory can be saved by CMC diagnostic system 10 for future reference of the machine user.

3. User Generated Reference Profiles

The user of CMC diagnostic system 10 can elect to save input, output, register, and analog data that represent good operation of a machine, process, or subset thereof. This data is then available for future reference when the machine is not operating properly. CMC diagnostic system 10 can then make comparisons between such reference data and the operating data at the time of a problem.

4. Automatic Data Generation for Corrective Maintenance

It is possible for the user of CMC diagnostic system 10 to save operating data during a malfunction and compare that data to future malfunctions. If the same problem repeats itself, CMC diagnostic system 10 can record the number of problem repeats in a time period. The information on repeats of the same problem may be used to design corrective actions that eliminate such repeating problems.

5. Automatic Logging of Actual Procedures and Productivity

CMC diagnostic system 10 is preferably capable of being programmed to record the actual procedures used by a machine operator during start up. Exact button strokes and other operator control actions can be logged in the sequence in which they occurred. In this way, operator generated malfunction during start up may be detected and corrected. Further, the time between key strokes may be logged by CMC diagnostic system 10 and reported. In this way, operator productivity during start up and even during normal production may be recorded and measured.

6. On-Line Job Aids for Machine and Process Operators

The machine status screens 138 that are generated by CMC diagnostic system 10 operate as automatic job aids for the machine operator. Such job aids are currently generated manually, and often at considerable cost. The job aids generated by CMC diagnostic system 10 automatically update themselves as the reference data system is changed.

7. Automatic Logging of Shutdown Procedures

CMC diagnostic system 10 may be utilized to record and store a sequence of events generated by operator keystrokes and other actions during shutdown. This data may then be used in future shutdowns to effect a correct shutdown procedure and/or to determine if shutdown problems are operator generated.

8. Use for Debugging Programs

CMC diagnostic system 10 may be utilized by programmers and engineers to debug new CMC programs. Specifically, CMC diagnostic system 10 can be used to detect program errors and to separate program errors from mechanical malfunction during program development. And, CMC diagnostic system 10 can be used on simulators for testing the efficacy of program logic.

9. Automatic Time Study by Elements of the Machine Cycle

Utilizing the stored information in the relational database, a user may select an element of a machine cycle to review and to perform statistical analysis upon. In this situation an element is generally defined as the time from any channel transition to any other channel transition. In so doing, a user may observe whether the selected element of the machine cycle has undergone a statistically significant deviation and correct accordingly. This allows the user to make comparisons of current machine productivity against reference machine productivity.

The present invention may be embodied in other specific forms without departing from the spirit of the essential attributes thereof; therefore, the illustrated embodiments should be considered in all respects as illustrative and not restrictive, reference being made to the appended claims rather than to the foregoing description to indicate the scope of the invention.

What is claimed is:

1. A computerized machine control (CMC) monitoring system, wherein said CMC controls operation of a plurality of digital channels under direction of a control program, said system comprising:
   a data acquisition component, wherein said data acquisition component is in communication with said CMC, and wherein said data acquisition component acquires transition data about said plurality of digital channels;
   a data storage component, wherein said data storage component is in communication with said data acquisition component, wherein said data storage component stores the acquired transition data to establish an historical pattern of transition data that is comparable to current transition data independent of the control program; and
   a viewing component, wherein said viewing component is in communication with said data storage component, and wherein said viewing component displays a sequence diagram of said historical pattern of transition data defined by a first average transition time to on, a second average transition time to off, and a duration time of an individual channel for substantially all of said plurality of digital channels on an individual basis and a sequence diagram of said current transition data.

2. The system of claim 1, wherein said historical pattern of transition data of the individual channel in said sequence diagram display is further defined by a statistical window about each of said first average transition time and said second average transition time.

3. The system of claim 1, wherein said first average transition time and said second transition time are calculated from a pre-selected reference data set.

4. The system of claim 1, wherein said sequence diagram of said current transition data and said sequence diagram of said historical pattern of transition data overlay each other.

5. The system of claim 1, wherein said sequence diagram include a substantially real-time scrolling cursor.

6. The system of claim 5, wherein said substantially real-time scrolling cursor stops scrolling at an instant of a downtime event.

7. The system of claim 1, wherein said sequence diagram of said current transition data is capable of displaying intermittent failures in said plurality of digital channels.

8. The system of claim 1, wherein said viewing component displays a digital channel identifier proximate said sequence diagrams, wherein said digital identifier is selected from a group consisting of: an imported name, a user entered name, and an address.

9. The system of claim 1, wherein said sequence diagrams provide analog channel data.

* * * * *